US006331982B1

(12) United States Patent
Watanabe

(10) Patent No.: US 6,331,982 B1
(45) Date of Patent: *Dec. 18, 2001

(54) CONNECTION CONTROL SYSTEM AND METHOD IN A SWITCH

(75) Inventor: Yoshihiro Watanabe, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/692,475

(22) Filed: Aug. 6, 1996

(30) Foreign Application Priority Data

Aug. 31, 1995 (JP) .................................................. 7-223514

(51) Int. Cl.[7] .................................................. H04L 12/56
(52) U.S. Cl. .......................................... 370/399; 370/426
(58) Field of Search .................................... 370/389, 392, 370/393, 395, 396, 397, 398, 399, 409, 410, 419, 420, 422, 423, 424, 426, 247, 248, 250, 252

(56) References Cited

U.S. PATENT DOCUMENTS

| 5,084,867 | * | 1/1992 | Tachibana et al. | 370/398 |
|---|---|---|---|---|
| 5,257,311 | * | 10/1993 | Naito et al. | 370/244 |
| 5,265,088 | * | 11/1993 | Takigawa et al. | 370/249 |
| 5,313,453 | * | 5/1994 | Uchida et al. | 370/248 |
| 5,339,310 | * | 8/1994 | Taniguchi | 370/397 |
| 5,440,565 | * | 8/1995 | Miyamoto et al. | 370/248 |
| 5,483,525 | * | 1/1996 | Song et al. | 370/392 |
| 5,500,851 | * | 3/1996 | Kozaki et al. | 370/250 |
| 5,544,164 | * | 8/1996 | Baran | 370/397 |
| 5,583,858 | * | 12/1996 | Hanaoka | 370/392 |
| 5,602,826 | * | 2/1997 | Yoshimura et al. | 370/248 |
| 5,623,405 | * | 4/1997 | Isono | 395/230 |
| 5,636,222 | * | 6/1997 | Uriu et al. | 370/390 |
| 5,719,863 | * | 2/1998 | Hummel | 370/392 |
| 5,771,231 | * | 6/1998 | Watanabe | 370/377 |

FOREIGN PATENT DOCUMENTS 6224934    8/1994  (JP) .

* cited by examiner

Primary Examiner—Wellington Chin
Assistant Examiner—Kwang B. Yao
(74) Attorney, Agent, or Firm—Rosenman & Colin, LLP

(57) ABSTRACT

A call process processor (CC) outputs a control instruction of a connection only to a line response unit at a source side. The line response unit at the source side transmits a connection control cell where a VPI/VCI corresponding to a specified connection is set, tag information indicating a route to a line response unit at a destination side is set, connection control information identifying it as the connection control cell is set in an empty area of the header and connection information for controlling the specified connection is stored, to an ATM switch. The line response unit at the destination side extracts the connection control cell which is transmitted from the line response unit at the source side and input from the ATM switch according to the connection control information, and controls the specified connection according to the extracted connection control cell.

13 Claims, 16 Drawing Sheets

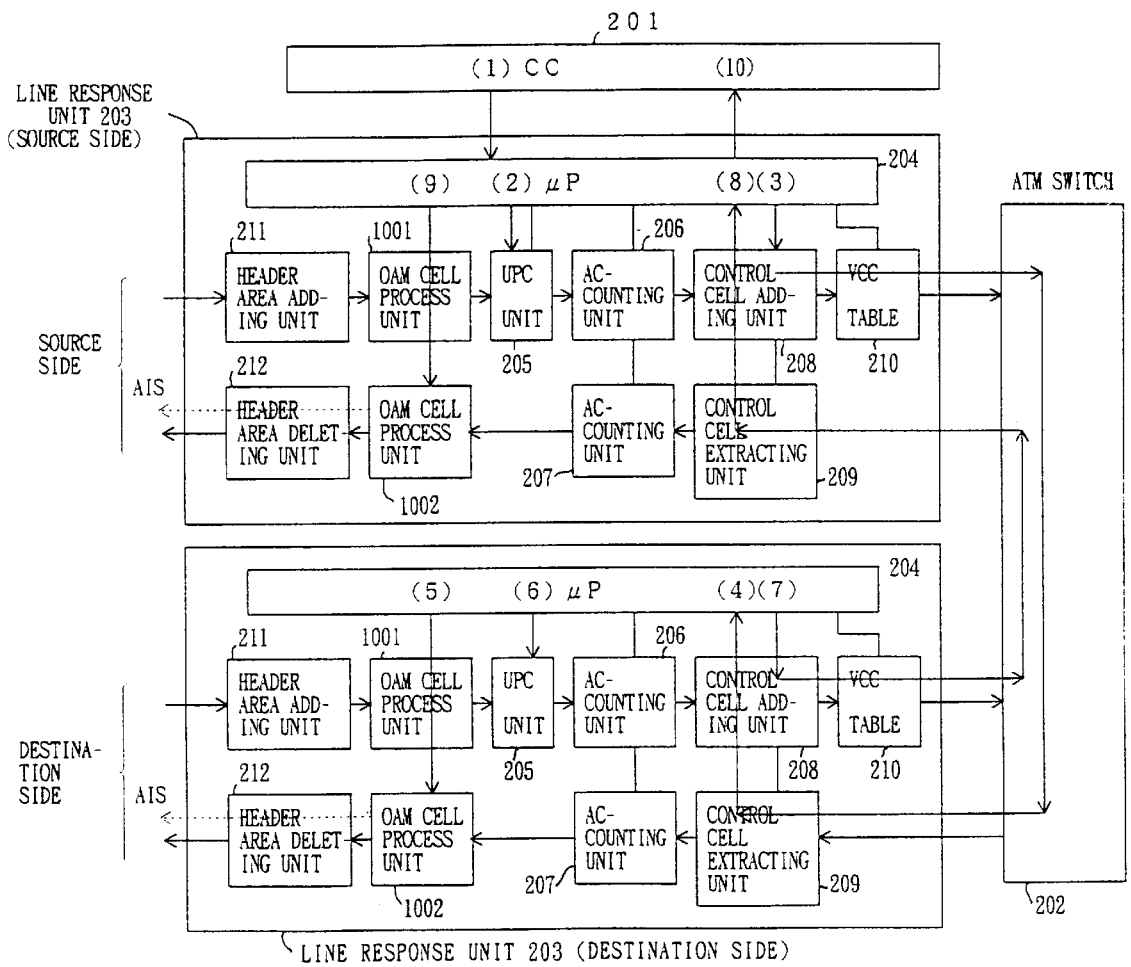
F I G. 10

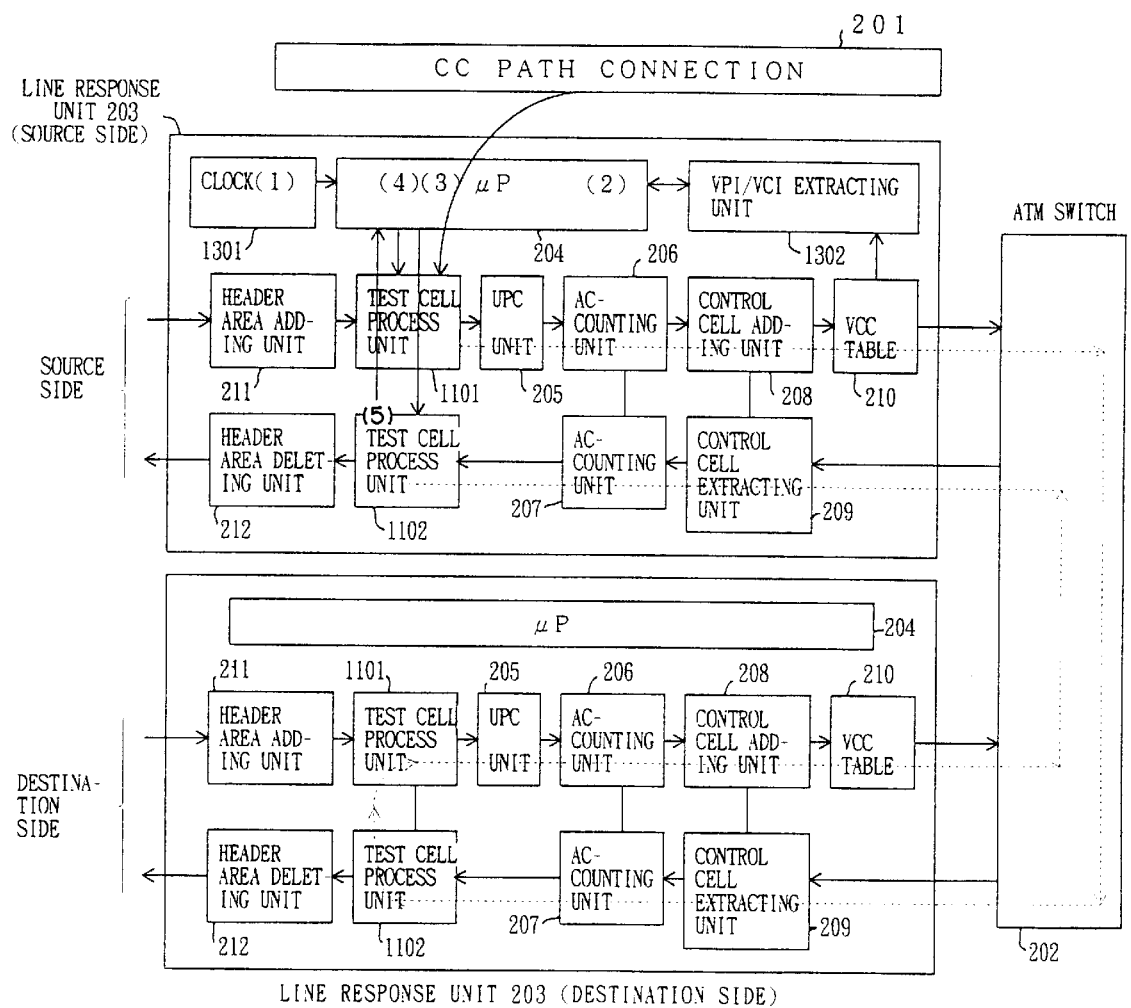
F I G. 13

CONNECTION CONTROL SYSTEM AND METHOD IN A SWITCH

BACKGROUND OF THE INVENTION

1. Field of the Invention

The present invention relates to a connection control system and a method in a switch.

2. Description of the Related Art

Discussions about an ATM (Asynchronous Transfer Mode) switching technique are frequently made as a technique for implementing a broadband ISDN (Integrated Services Digital Network) of a next-generation switching system, in various organizations. An ATM switch exchanges contents of subscriber information (data, voice data, image data, etc.) using a fixed-length packet called a cell. The ATM switch identifies each connection according to a value of a VPI/VCI defined in a header of the cell, and makes the cell self-route to a target output line by adding routing information called a tag corresponding to a connection specified in the input cell at an entry point of the switch. This capability is one of the features of the ATM switching method.

A connection is normally a pair of an upward connection (from a subscriber at a source side to a subscriber at a destination side) and a downward connection (from the subscriber at the destination side to the subscriber at the source side). Therefore, if a connection is established between these two subscribers, an instruction for establishing the connection must be given to line response units at both sides where the subscribers are respectively accommodated. Accordingly, a timing when the subscriber information can be transferred in the upward connection is different from that in the downward connection, and a time for establishing the connection is expected to be longer. Therefore, it is vital to shorten the time for establishing the connection.

In a conventional switching control method, as shown in FIG. 1, a central control processor (CC) 101 which controls a call outputs an instruction for establishing a connection corresponding to each of microprocessors ($\mu$ps) in each of line response units 103 at source and destination sides, with an ATM switch 102 in between. Each of the microprocessors in each of the line response units 103 sets connection information for each piece of hardware in each of the line response units. Such hardware details a UPC (Usage Parameter Control) unit, an NPC (Network Parameter Control) unit, an accounting counter unit, a VCC (Virtual Channel Controller) table, etc.

With the conventional technique shown in FIG. 1, however, when a CC 101 transmits the instruction of establishing a connection to each of the line response units 103 at the source and destination sides, a process delay until an establishment of the connection becomes extended.

If a result of the process of establishing a connection in either of the line response units 103 is NG, an instruction for releasing the connection must be given to the other of the line response units 103 in which the result of the process of establishing the connection is OK. As a result, control of establishing a connection becomes complicated.

Even if the instruction for establishing the connection is transmitted respectively to the line response units 103 at the source and destination sides, it does not verify a proper exchange of cells between the line response units 103 at the source and destination sides via the ATM switch 102. Accordingly, the cells may not flow properly when a subscriber starts a communication.

Furthermore, since the line response units 103 at the source and destination sides work both mutually and independently, it is difficult to examine the quality of the overall connection between the line response units 103 at the source and destination sides.

SUMMARY OF THE INVENTION

The present invention is made in order to overcome the above described problems, and aims at implementing a consistent control for line response units both at the source and destination sides, when a connection is established/released.

First of all, the first embodiment of the present invention is described below.

This embodiment assumes a method for controlling a connection for use in a switch where a fixed-length cell including connection identification information input via a first or a second line response unit from a first or a second line is transmitted to the second or the first line as opposed to the first or the second line, via the second or the first line response unit as opposed to the first or the second line response unit, by being self-switched according to routing information added to a header of the cell.

The first or the second line response unit transmits a connection control cell where connection identification information corresponding to a specified connection is set, routing information indicating a route to the second or the first line response unit as opposed to the first or the second line response unit is set in a header, connection control information identifying it as a connection control cell is set in an empty area of the header, and connection information for controlling the specified connection is stored, to a switch.

The second or the first line response unit then extracts the connection control cell which is transmitted from the first or the second line response unit as opposed to the second or the first line response unit, and input from the switch, according to the connection control information.

After that, the first and the second line response unit performs communication of the connection information using the connection control cell.

The above described first embodiment is made more specific by the following second and third embodiments of the present invention.

The second embodiment of the present invention is a mechanism related to a process of establishing a connection, and performs the following operations.

If an instruction for establishing a connection is given by a call control processor, etc., the first line response unit establishes a specified connection in a state where an inflow of subscriber cells corresponding to the specified connection from the first line is halted.

The first line response unit which establishes the specified connection then transmits a connection control cell where connection identification information corresponding to the specified connection is set, routing information indicating a route to the second line response unit as opposed to the first line response unit is set in a header, connection control information identifying it as a connection control cell is set in an empty area of the header, and connection information for establishing the specified connection is stored, to a switch.

Next, the second line response unit extracts the connection control cell which is transmitted from the first line response unit as opposed to the second line response unit and input from the switch, according to the connection control information.

The second line response unit establishes the specified connection according to the connection information included in the extracted connection control cell.

Then, the second line response unit starts an inflow of subscriber cells corresponding to the specified connection from the second line according to the connection information included in the extracted connection control cell.

The second line response unit transmits the connection control cell which includes the connection identification information corresponding to the specified connection, the routing information indicating a route to the first line response unit as opposed to the second line response unit in the header, the connection control information identifying it as the connection control cell in the empty area of the header, and the connection information indicating a result of establishing the specified connection, to the switch.

The first line response unit extracts the connection control cell which is transmitted from the second line response unit as opposed to the first line response unit and input from the switch, according to the connection control information.

Lastly, the first line response unit starts an inflow of subscriber cells corresponding to the specified connection from the first line, according to the connection information included in the extracted connection control cell.

A connection control system according to the third embodiment of the present invention relates to a mechanism for releasing a connection, and performs the following operations.

If an instruction for releasing a connection is given by a call control processor, etc., the first line response unit halts an inflow of subscriber cells corresponding to a specified connection from the first line.

Then, the first line response unit transmits a connection control cell which includes connection identification information corresponding to the specified connection, routing information indicating a route to the second line response unit as opposed to the first line response unit in an header, connection control information identifying as a connection control cell in an empty area of the header, and the connection information for releasing the specified connection, to a switch.

Next, the second line response unit extracts the connection control cell which is transmitted from the first line response unit as opposed to the second line response unit and input from the switch, according to the connection control information.

The second line response unit halts an inflow of subscriber cells corresponding to the specified connection from the second line, according to the connection information included in the extracted connection control cell.

The second line response unit then releases the specified connection according to the connection information included in the extracted connection control cell.

The second line response unit transmits the connection control cell which includes the connection identification information corresponding to the specified connection, the routing information indicating a route to the first line response unit as opposed to the second line response unit in the header, the connection control information identifying it as the connection control cell in the empty area in the header, and the connection information indicating a result of releasing the specified connection, to the switch. Note that after releasing the specified connection, the second line response unit may halt an accounting process in the second line response unit, and then transmit the connection control cell where a result of the accounting process is stored as part of the connection information indicating the result of releasing the specified connection, to the switch.

The first line response unit then extracts the connection control cell which is transmitted from the second line response unit as opposed to the first line response unit and input from the switch, according to the connection control information.

Lastly, the first line response unit releases the specified connection according to the connection information included in the extracted connection control cell. Note that after releasing the specified connection, the first line response unit may halt the accounting process in the first line response unit and output a result of the accounting process together with the result of the accounting process in the second line response unit notified by the connection control cell, to a call control processor, etc.

In the above described first through third embodiments, once a call control processor, for example, outputs the instruction for establishing/releasing a connection only to the first line response unit, the first and the second line response units exchange the connection information using the connection control cell to complete the establishment/release of the specified connection in the second line response unit.

As a result, in the process of establishing/releasing a connection in the first through the third embodiments of the present invention, the number of outputs of the instructions for establishing/releasing a connection to the line response units can be significantly reduced, thereby simplifying the process of establishing/releasing a connection.

Furthermore, since the connection control cell is exchanged using a highway in a cell switch in the process of establishing/releasing a connection in the first through third embodiments of the present invention, a process of controlling a connection can be made faster.

If the result of the process of establishing a connection in the first line response unit is NG in the process of establishing a connection in the second embodiment of the present invention, for example, the first line response unit is required to suspend a transmission of the connection control cell to the second line response unit and return NG to a call control processor, etc. On the contrary, when receiving the connection control cell indicating that the result of the process of establishing the connection in the second line response unit from that unit, the first line response unit is required to return NG to the call control processor, etc. after it releases the established connection in the first line response unit. The call control processor, etc., is required to, for example, only receive the result of establishing the connection in both of the cases, thereby simplifying the process of establishing the connection.

Additionally, in the process of establishing a connection in the second embodiment of the present invention, communication of the connection control cell between the first line response unit and the second line response unit is performed using the same VPI/VCI and tag information as those used in a case of transmitting a subscriber cell in a connection currently being established, thereby simultaneously verifying whether or not cells are properly exchanged between the first line response unit and the second line response unit via a switch.

Furthermore, in the process of establishing/releasing a connection in the first through third embodiments of the present invention, as the communication of the connection control cell is performed within a connection currently being established/released using a VPI/VCI and the routing information secured by the call control processor, etc., the communication of the connection control cell may not affect a communication of a subscriber cell, etc.

In the process of releasing a connection in the third embodiment of the present invention, a read operation of a result of the accounting process can be performed without inconsistency.

Provided below is the explanation about the fourth embodiment of the present invention.

This embodiment is based on an assumption similar to that of the first embodiment of the present invention, and relates to a method for closing a connection.

If a close request is made by a call control processor, etc., the first line response unit halts an inflow of subscriber cells corresponding to a specified connection from the first line.

Then, the first line response unit transmits a connection control cell where connection identification information corresponding to the specified connection is set, routing information indicating a route to the second line response unit as opposed to the first line response unit is set in a header, connection control information identifying it as the connection control cell is set in an empty area of the header, and connection information for closing the specified connection is stored, to a switch.

The second line response unit then extracts the connection control cell which is transmitted from the first line response unit as opposed to the second line response unit and input from the switch, according to the connection control information.

The second line response unit halts an inflow of subscriber cells corresponding to the specified connection from the second line, according to the connection information included in the extracted connection control cell.

Next, the second line response unit transmits an alarm indication cell which includes the connection identification information corresponding to the specified connection, and an alarm indication indicating an occurrence of a problem in the specified connection, to the second line.

The second line response unit then transmits the connection control cell which includes the connection identification information corresponding to the specified connection, the routing information indicating a route to the first line response unit as opposed to the second line response unit in a header, the connection control information identifying as the connection control cell in an empty area of the header, and the connection information indicating a result of closing the specified connection, to the switch.

The first line response unit extracts the connection control cell which is transmitted from the second line response unit as opposed to the first line response unit and input from the switch, according to the connection control information.

Lastly, the first line response unit transmits the alarm indication cell which includes the connection identification information corresponding to the specified connection according to the connection, and the alarm indication indicating the occurrence of the problem in the specified connection, to the first line, according to the connection information included in the extracted connection control cell.

In the above described fourth embodiment of the present invention, the call control processor etc. makes a close request, for example, only to the first line response unit, so that the close process in both of the first and the second line response units and the process of transmitting the alarm indication cell to the first and the second lines can be implemented. As a result, a high-speed close process of a connection can be implemented.

Provided below is the explanation about the fifth embodiment of the present invention.

This embodiment is based on an assumption similar to that of the second embodiment, and aims at implementing an automatic test of a connection when the connection is established.

That is, in the above described configuration of the second embodiment of the present invention, after starting an inflow of subscriber cells corresponding to a specified connection from the first line, the first line response unit transmits a test cell where connection identification information corresponding to a specified connection is set, routing information indicating a route to the second line response unit as opposed to the fist line response unit is set in a header, and test cell identification information identifying it as a test cell is attached, to a switch.

Then, the second line response unit extracts the test cell which is transmitted from the first line response unit as opposed to the second line response unit and input from the switch, according to the test cell identification information.

Next, the second line response unit returns the extracted test cell to the switch after it stores the routing information indicating a route to the first line response unit as opposed to the second line response unit in the header.

The first line response unit extracts the test cell which is transmitted from the second line response unit as opposed to the first line response unit and input from the switch, according to the test cell identification information.

Lastly, the first line response unit tests the specified connection based on a relationship between the respective test cells which the first line response unit transmitted and extracted.

According to the above described fifth embodiment of the present invention, the automatic test of a connection between the first and second line response units can be conducted simultaneously with the process of establishing the connection.

Provided below is the explanation about the sixth embodiment of the present invention.

In this embodiment, with the configuration based on an assumption similar to that of the above described first embodiment of the present invention, an automatic test similar to that of the fifth embodiment of the present invention is conducted in the first line response unit voluntarily and periodically.

The first line response unit transmits a test cell where connection identification information corresponding to a specified connection is set, routing information indicating a route to the second line response unit as opposed to the first line response unit is set in a header, and test cell identification information identifying it as a test cell is attached, to a switch at predetermined intervals for each of connections specified in the first line response unit.

The second line response unit extracts the test cell which is transmitted from the first line response unit as opposed to the second line response unit and input from the switch, according to the test cell identification information.

Then, the second line response unit returns the extracted test cell to the switch after it stores the routing information indicating a route to the first line response unit as opposed to the second line response unit in the header.

The first line response unit extracts the test cell which is transmitted from the second line response unit as opposed to the first line response unit and input from the switch, according to the test cell identification information.

Lastly, the first line response unit tests the specified connection based on a relationship between the test cells which the first line response unit transmitted and extracted.

According to the above described sixth embodiment of the present invention, the automatic test of the connection between the first and second line response units can be performed periodically, even in a process other than the process of establishing a connection.

Provided below is the explanation about the seventh embodiment of the present invention.

This embodiment assumes the configuration of the second and third embodiments of the present invention, and implements a process of establishing/releasing a point-to-multipoint connection where a fixed-length cell which is input from the first line via the first line response unit, and includes connection identification information, is transferred to a plurality of second lines as opposed to the first line via a plurality of second line response units as opposed to the first line response unit, by being self-switched and copied in a switch according to routing information added to a header of the cell.

In this case, the first line response unit stores line response unit identification information for identifying one of the plurality of second line response units as opposed to the first line response unit, in a connection control cell when transmitting the connection control cell to the switch.

The second line response unit extracts the connection control cell which is transmitted from the first line response unit as opposed to the second line response unit and input from the switch, according to the connection control information and the line response unit identification information.

According to the above described seventh embodiment of the present invention, once a call control processor, for example, outputs an instruction for establishing/releasing a connection only to the first line response unit, the first line response unit can transmit the connection information to each of the plurality of the second line response units identified by the line response unit identification information, using the connection control cell. As a result, the process of establishing/releasing a point-to-multipoint connection can be simplified and made faster.

Provided last is the explanation about the eighth embodiment of the present invention.

According to this embodiment, the first or the second line response unit mutually performs a communication using a connection control cell including connection information, not in a payload but in an empty area of a header, thereby implementing an efficient communication of the connection information.

BRIEF DESCRIPTION OF THE DRAWINGS

One skilled in the art can easily understand additional features and objects of this invention from the description of the preferred embodiments and with reference to the attached drawings. In the drawings:

FIG. 10 is a block diagram showing a configuration of the second preferred embodiment of the present invention;

FIG. 13 is a block diagram showing a configuration of the fourth preferred embodiment of the present invention;

DESCRIPTION OF THE PREFERRED EMBODIMENTS

Detailed explanations about the preferred embodiments of the present invention are hereinafter provided.

Configuration of an ATM Switch Applied to Each of the Preferred Embodiments

Figure 1:
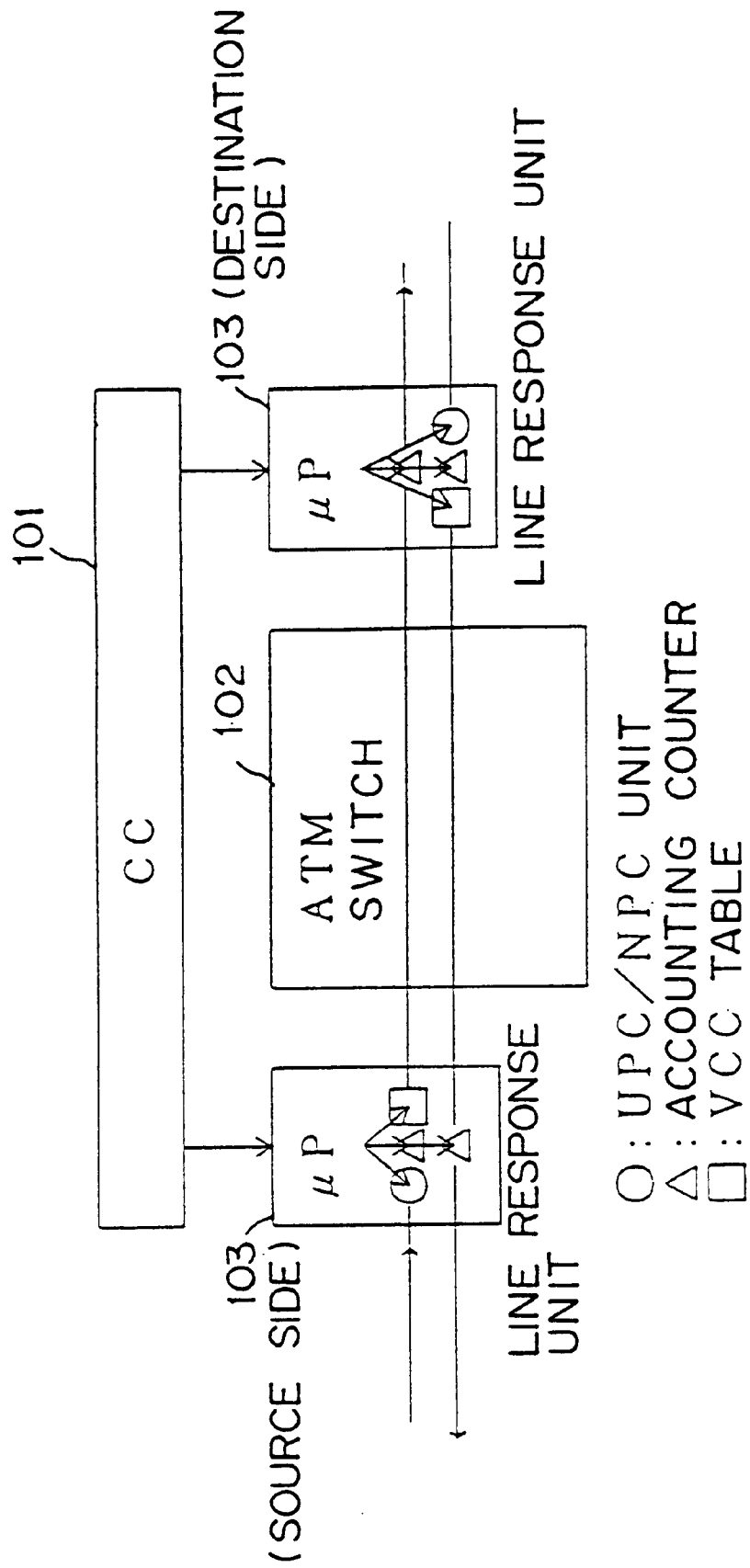
FIG. 1 is a block diagram showing a conventional switch control method.
Figure 2:
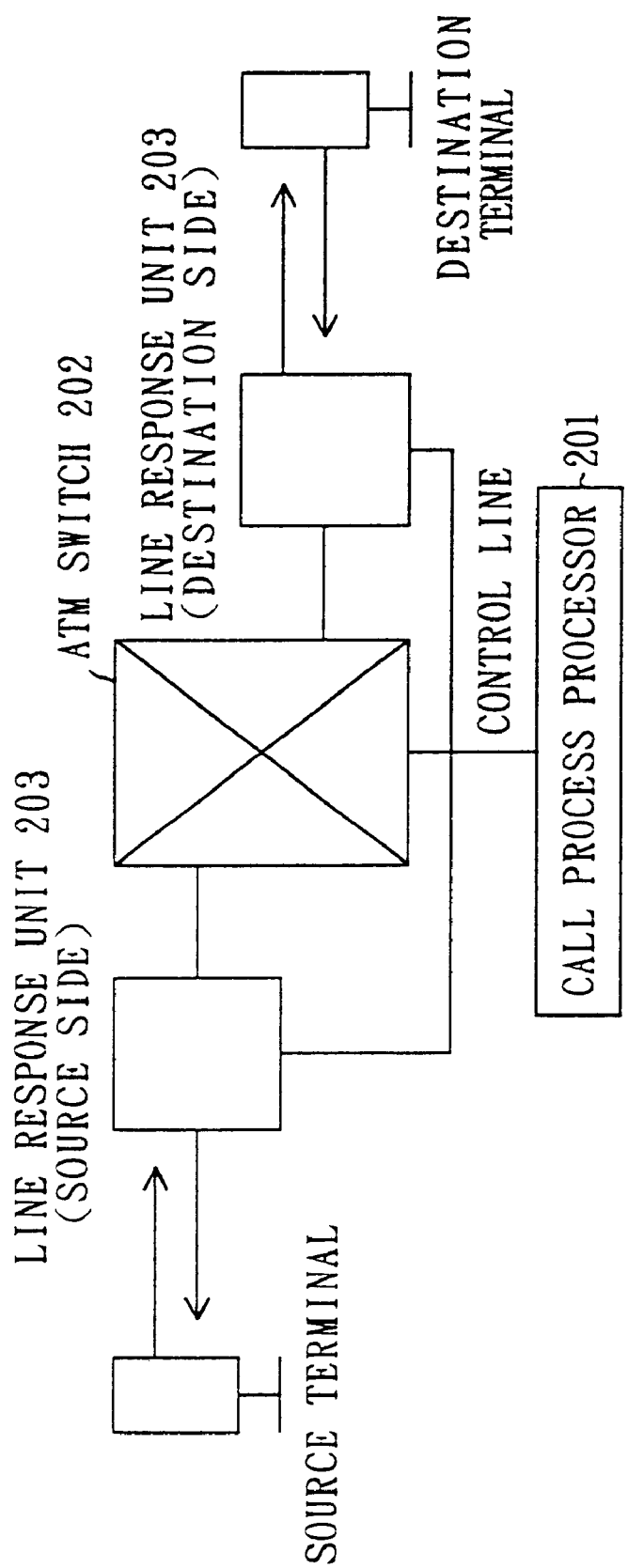
FIG. 2 is a block diagram showing a configuration of an ATM switch applied to each of the preferred embodiments of the present invention.

FIG. 2 shows a configuration of an ATM switch applied to each of the preferred embodiments of the present invention.

A call process processor 201 performs a call control process.

An ATM switch 202 performs a switching process for a cell input via a line response unit 203.

A line response unit 203 is a unit at which a subscriber line or a trunk line terminates. In the preferred embodiment shown in FIG. 3, both of line response units at source and destination sides are equipped with subscriber lines. Alternatively, either or both of the line response units at the source and destination sides may be equipped with trunk lines. The line response unit 203 at the source side is defined to be a unit equipped with a subscriber line with which a source terminal making a call is connected, while the line response unit 203 at the destination side is defined to be a unit equipped with a subscriber line with which a destination terminal receiving the call is connected.

The First Preferred Embodiment

Figure 3:
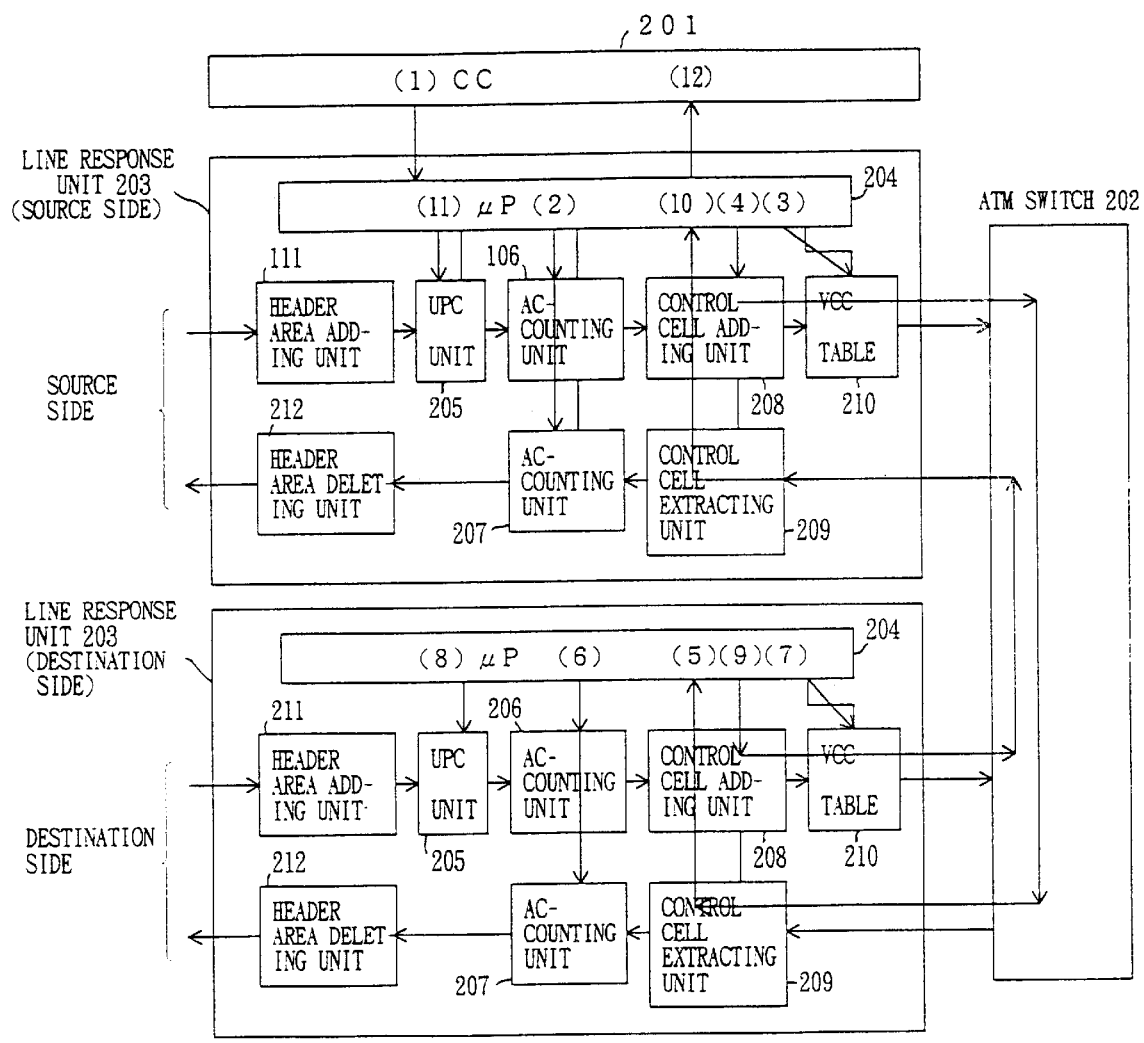
FIG. 3 is a block diagram showing a configuration of the first preferred embodiment of the present invention (No. 1)

FIG. 3 is a block diagram showing a structure of the first preferred embodiment of the present invention, based on the configuration of the ATM switch shown in FIG. 2.

A microprocessor (μP) 204 in each of the line response units 203 at the source and destination sides controls operations performed by the whole of each of the line response units 203. The feature which particularly relates to the present invention is that only the microprocessor 204 in the line response unit 203 at the source side performs a communication of connection information between a CC 201 and itself.

Then, a UPC (Usage Parameter Control) unit 205 in each of the line response units 203 at the source and destination sides is a unit controlling a quantity of using subscriber cells input to the ATM switch 202 via an input line. If the input line is a trunk line, an NPC (Network Parameter Control) unit, which is a unit controlling the quantity of using relayed subscriber cells is arranged instead of the UPC unit 205.

Accounting units 206 and 207 in the line response units 203 at the source and destination sides, which are respectively arranged on a route from the line to the ATM switch 202 and on a route from the ATM switch 202 to the line, count the number of cells passing the respective routes.

A control cell adding unit 208 in the line response unit 203 at the source side, which particularly relates to the present invention, generates a connection control cell including connection information that the microprocessor 204 in the line response unit 203 at the source side receives from the CC 201, and transmits it to the route from the line at the source side to the ATM switch 202, toward the line response unit 203 at the destination side. A control cell extracting unit 209 in the line response unit 203 at the destination side extracts only the connection control cell, and transfers the connection information included in the extracted connection control cell to the microprocessor 204 in the line response unit 203 at the destination side. The control cell adding unit 208 in the line response unit 203 at the destination side generates a connection control cell including a result of establishing a connection stored by the microprocessor 204 in the line response unit 203 at the destination side, and transmits it to the route from the line at the destination side to the ATM switch 202, toward the line response unit 203 at the source side. The control cell extracting unit 209 in the line response unit 203 at the source side extracts only the connection control cell, and transfers the result of establishing the connection included in that cell to the microprocessor 204 in the line response unit 203 at the source side.

Figure 4:
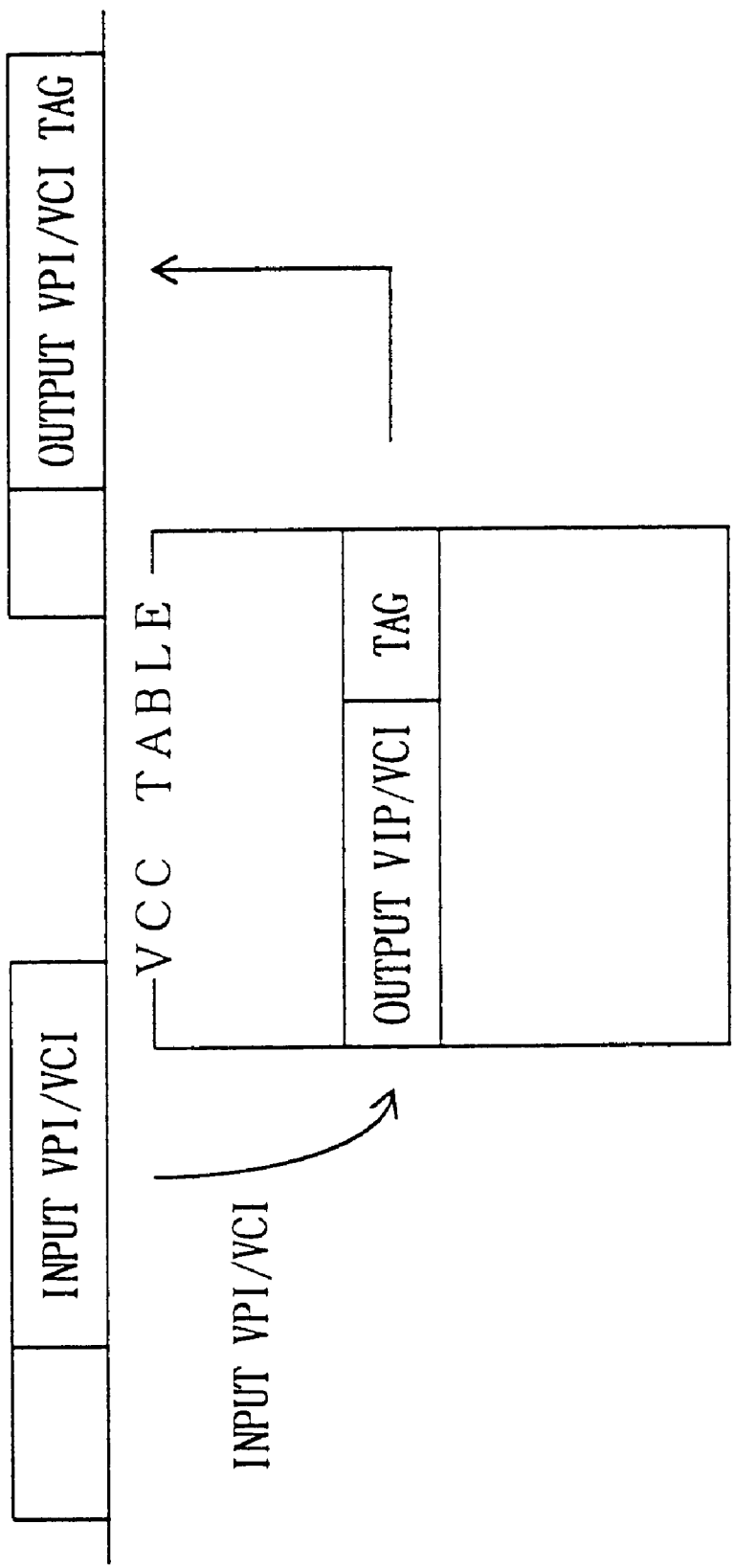
FIG. 4 shows a structure of a VCC table.

A VCC table 210 in each of the line response units 203 at the source and destination sides replaces a VPI/VCI attached to a header of a cell input to the ATM switch 202 corresponding to an input line, with a VPI/VCI corresponding to an output line, and at the same time, attaches tag information "TAG" which is routing information for self-routing the cell in the ATM switch 202 to the beginning of the cell. As shown in FIG. 4, the VCC table 210 has a structure where each output VPI/VCI and each piece of the tag information "TAG" are stored at each address corresponding to each input VPI/VCI.

A header area adding unit 211 in each of the line response units 203 at the source and destination sides is a unit which makes a header format of a subscriber cell input from each of the lines to the ATM switch 202 suitable for a format of the switch.

A header area deleting unit 212 in the each of the line response units 203 at the source and destination sides is a unit which makes a header format of a subscriber cell output from the ATM switch 202 to each of the lines suitable for the format of each of the lines.

Provided below is the explanation about operations performed by the connection control system according to the first preferred embodiment having the above described configuration.

First of all, a process of establishing a connection in the first preferred embodiment is described below.

Figure 5:
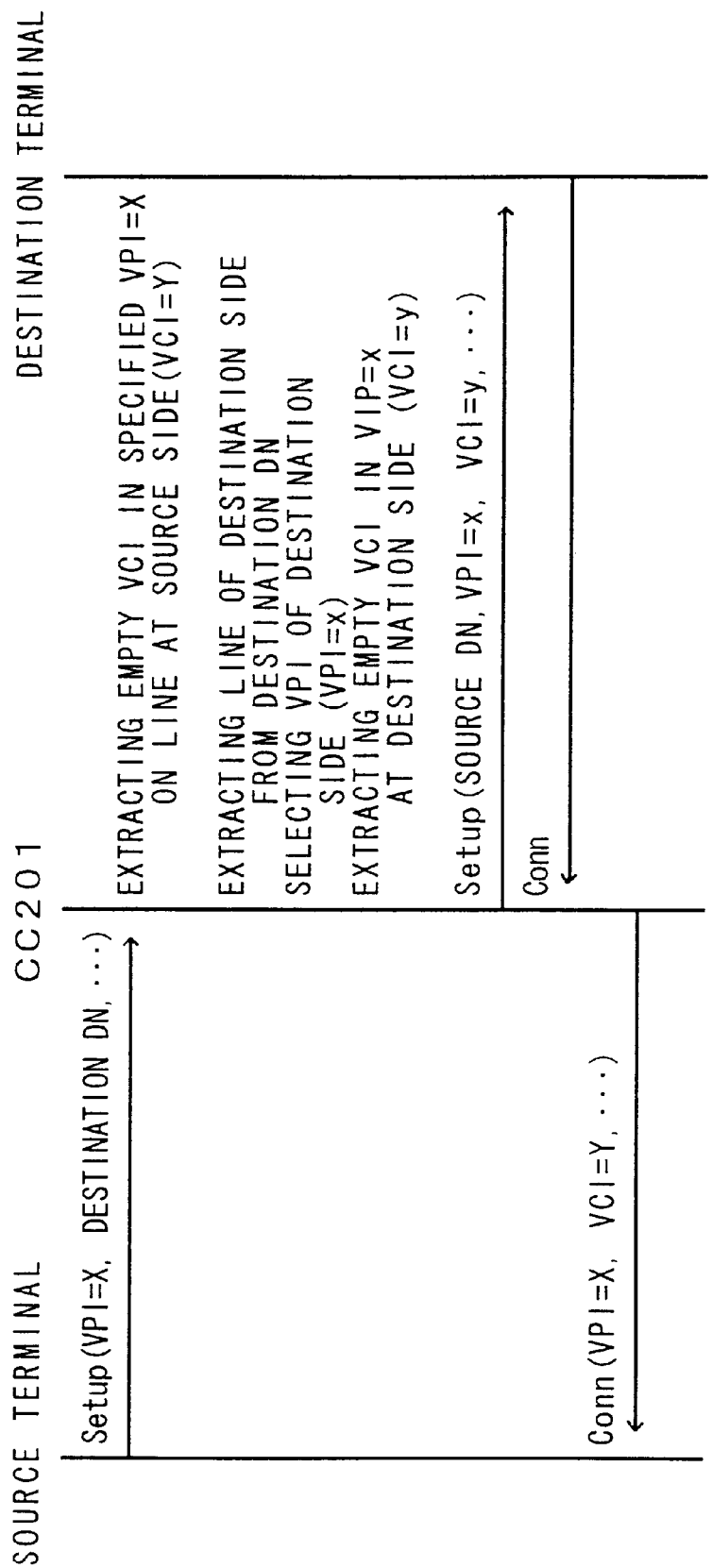
FIG. 5 shows a procedure of determining a VPI/VCI when a connection is requested.

FIG. 5 shows a method for determining a VPI/VCI when a connection is requested.

When communication starts, a source terminal transmits a Setup signal including a VPI=X reserved by the source terminal and a destination dial number (destination DN) to a CC 201.

When receiving the Setup signal, the CC 201 extracts an empty VCI=Y in the VPI=X specified by this signal on a line at the source side.

The CC 201 then extracts a line at a destination side according to the destination DN specified by the Setup signal, and selects a corresponding VPI=x at the destination side.

The CC 201 further extracts an empty VCI (VCI=y) in the selected VPI=x at the destination side.

As described above, the VPI=X is determined as an input VPI, the VCI=Y is determined as an input VCI, the VPI=x is determined as an output VPI, and the VCI=y is determined as an output VCI.

Then, the CC 201 transmits the Setup signal including the VPI=x, the VCI=y, and a source dial number (source DN) to the destination terminal.

The destination terminal returns a Conn signal (connection signal) to the CC 201 in response to the Setup signal.

When receiving the Conn signal, the CC 201 transmits this signal including the VPI=X, the VCI=Y, etc. to the source terminal.

After the source terminal receives the Conn signal, a connection is established between the source terminal and the destination terminal.

Once the connection is established as described above, the CC 201 transfers the connection information composed of an input VPI, an input VCI, an output VPI, an output VCI, upward tag information, downward tag information, upward UPC information, downward UPC information, and accounting instruction existence/non-existence identification information, and an instruction for establishing a connection to the microprocessor 204 in the line response unit 203 at the source side (FIG. 3 (1)).

The microprocessor 204 in the line response unit 203 at the source side which receives the above described connection information and the instruction for establishing a connection instructs the accounting units 206 and 207 in the line response unit 203 at the source side to start an accounting process, if the accounting instruction existence/non-existence identification information indicates an accounting start (FIG. 3 (2)).

Then, the microprocessor 204 in the line response unit 203 at the source side stores the above described output VPI, output VCI, and upward tag information, at an address corresponding to the above described input VPI/VCI in the VCC table 210 (FIG. 3(3)). The input VPI/VCI is a VPI/VCI attached to a cell input from the line at the source side to the ATM switch 202, and to a cell output from the ATM switch 202 to the line at the source side, while the output VPI/VCI is a VPI/VCI attached to a cell output from the ATM switch 202 to the line at the destination side, and to a cell input from the line at the destination side to the ATM switch 202.

After the connection is established, in the VCC table 210 in the line response unit 203 at the source side, the address corresponding to the input VPI/VCI included in the cell input from the line at the source side to the ATM switch 202 is accessed, so that the output VPI, the output VCI, and the upward tag information stored at that address are read, the input VPI/VCI included in the cell is replaced with the output VPI/VCI, and the read upward tag information is added to the beginning of the cell.

The microprocessor 204 in the line response unit 203 at the source side transfers the connection information, which must be stored in the line response unit 203 at the destination side, including the input VPI, input VCI, output VPI, output VCI, downward tag information, downward UPC information, and accounting instruction existence/nonexistence identification information, to the control cell adding unit 208 in the line response unit 203 at the source side. (FIG. 3 (4)). As a result, the control cell adding unit 208 generates a connection control cell whose payload includes the above described connection information, and transmits it to the VCC table 210 in the line response unit 203 at the source side.

Figure 6:
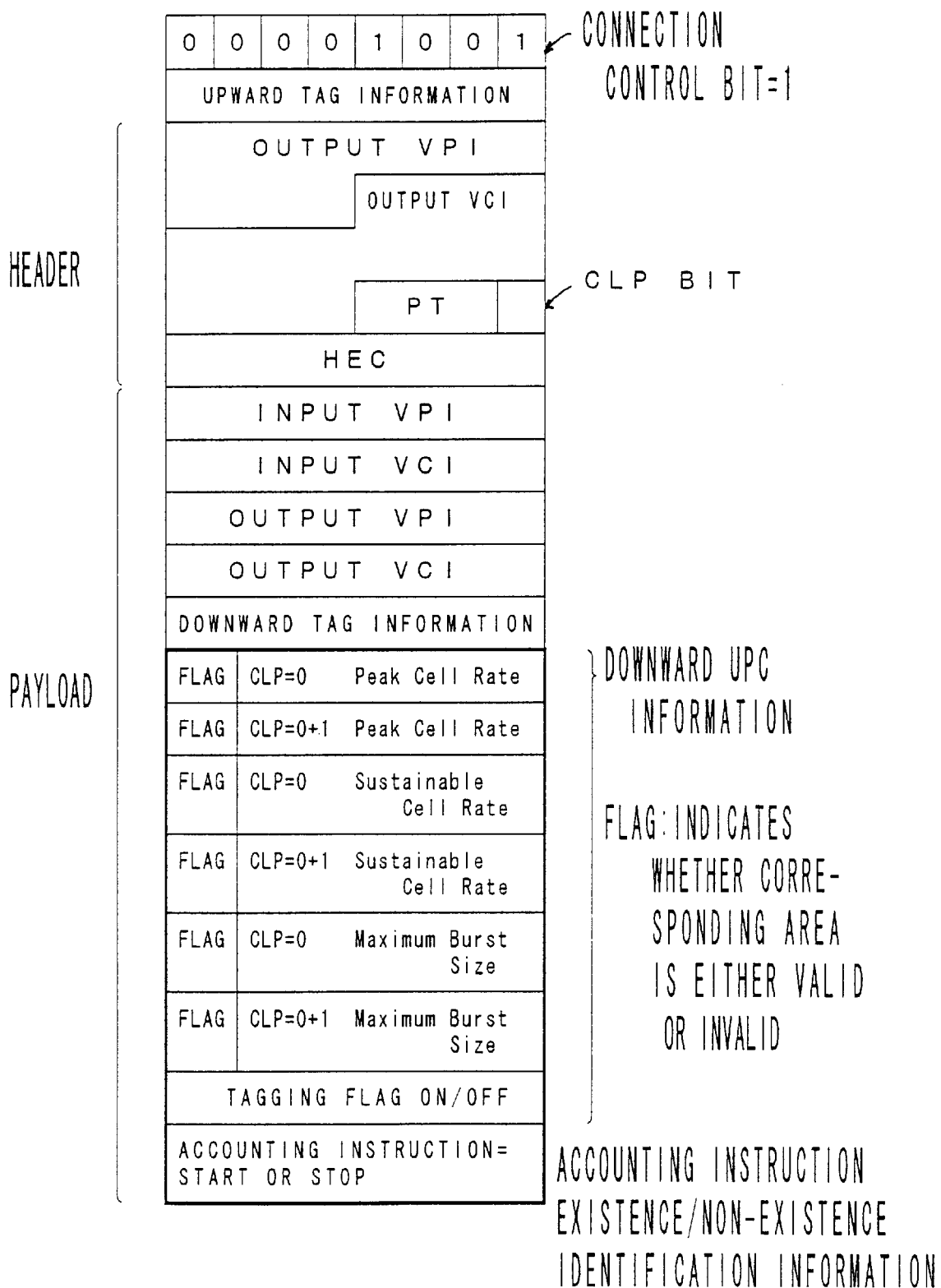
FIG. 6 shows a data format of a connection control cell transferred from a line response unit at a source side to a line response unit at a destination side when a connection is established.

FIG. 6 shows a data format of a connection control cell transmitted from the VCC table 210 in the line response unit 203 at the source side to the ATM switch 202, when a connection is established. A header of the connection control cell has the same VPI/VCI attached as that of the input VPI/VCI attached when a subscriber cell used in a connection currently being established is input from the line at the source side to the ATM switch 202, before it is input to the VCC table 210 in the line response unit 203 at the source side. This VPI/VCI is replaced with an output VPI/VCI in the VCC table 210. To the beginning of the connection control cell, the upward tag information is attached by the VCC table 210 as shown in FIG. 6. With the upward tag information, the cell with the attached upward tag information is self-transferred from the ATM switch 202 to the line response unit 203 at the destination side.

Additionally, a feature particularly relating to the present invention is that the value of a connection control bit "1" which indicates being a connection control cell which must be distinguished from a subscriber cell, is assigned to an empty bit at the beginning of the connection control cell by the control cell adding unit 208, as shown in FIG. 6.

Also as shown in FIG. 6, the header of the connection control cell includes a PT (payload type) field, a CLP (cell loss priority) field, a HEC (header error check) field, etc. in a similar manner as in a normal ATM cell. The PT (payload type) field is intended to identify an OAM (Operation, Administration and Maintenance) cell such as a subscriber cell, an AIS cell to be described later, etc. The CLP field is intended to determine a priority when discarding cells in one connection. The HEC field is intended to detect/correct an error of data in the header of a cell.

In the meantime, the control cell extracting unit 209 in the line response unit 203 at the destination side determines a value of the connection control bit at the beginning of a cell input from the ATM switch 202, outputs a normal subscriber cell, to which the value of the connection control bit "0" is assigned, to the accounting unit 207 as it is, and extracts only the connection control cell to which the value of the connection control bit "1" is assigned. The control cell extracting unit 209 then transfers each piece of connection information such as an input VPI, input VCI, output VPI, output VCI, downward tag information, downward UPC information, and accounting instruction existence/nonexistence identification information stored in the payload, to the microprocessor 204 in the line response unit 203 at the destination side (FIG. 3 (5)).

When receiving these pieces of information, the microprocessor 204 in the line response unit 203 at the destination side instructs the accounting units 206 and 207 to start an accounting process, if the received accounting instruction existence/nonexistence identification information indicates a start of the accounting process (FIG. 3 (6)).

Next, the microprocessor 204 in the line response unit 203 at the destination side stores the received input VPI, input VCI, and downward tag information at an address corresponding to the received output VPI/VCI in the VCC table 210 in the line response unit 203 at the destination side, in contrast with the case of the VCC table 210 in the line response unit 203 at the source side (FIG. 3 (7)).

After the connection is established, in the VCC table 210 in the line response unit 203 at the destination side, the address corresponding to the output VPI/VCI included in the cell input from the line at the destination side to the ATM switch 202 is accessed, so that the input VPI, input VCI, and downward tag information stored at that address are read, the output VPI/VCI included in the cell are replaced with the read input VPI/VCI, and the read downward tag information is attached to the beginning of the cell.

The microprocessor 204 in the line response unit 203 at the destination side stores the received downward UPC information in the UPC unit 205 in the line response unit 203 at the destination side (FIG. 3 (8)). As a result, the subscriber cell can be input from the line at the destination side to the ATM switch 202.

Then, the microprocessor 204 in the line response unit 203 at the destination side transfers the result of establishing the connection indicating the result of setting the connection information to the control cell adding unit 208 in the line response unit 203 at the destination side (FIG. 3 (9)). As a result, the control cell adding unit 208 generates a connection control cell which includes the result of establishing the connection in a payload, and transmits it to the VCC table 210 in the line response unit 203 at the destination side.

The beginning of the connection control cell contains the connection control bit as described above.

Additionally, the same VPI/VCI as the output VPI/VCI is attached when a subscriber cell to be used in a connection currently being established, input from the line at the destination side to the ATM switch 202, is attached to the header of the connection control cell, before the cell is input to the VCC table 210 in the line response unit 203 at the destination side. This VPI/VCI is replaced with the input VPI/VCI in the VCC table 210. To the beginning of the connection control cell, the downward tag information is attached by the VCC table 210. The cell with the attached downward tag information added is self-transferred from the ATM switch 202 to the line response unit 203 at the source side.

The control cell extracting unit 209 in the line response unit 203 at the source side determines the value of the connection control bit at the beginning of the cell input from the ATM switch 202, outputs a normal subscriber cell to which the value of the connection control bit "0" is assigned to the accounting unit 207 as it is, and extracts only the connection control cell to which the value of the connection control bit "1" is assigned. Then, the control cell extracting unit 209 transfers the result of establishing the connection included in the payload to the microprocessor 204 in the line response unit 203 at the source side (FIG. 3 (10)).

The microprocessor 204 in the line response unit 203 at the source side which receives the result of establishing the connection stores the upward UPC information previously received from the CC 201 in the UPC unit 205 in the line response unit 203 at the source side (FIG. 3 (11)). As a result, the subscriber cell can be input from the line at the source side to the ATM switch 202, and the establishment of the connection is completed.

Lastly, the microprocessor 204 in the line response unit 203 at the source side notifies the CC 201 of the result of establishing the connection in the line response unit 203 at the destination side in addition to the result of establishing the connection in the line response unit 203 at the source side (FIG. 3 (12)).

In the above described process of establishing a connection in the first preferred embodiment of the present invention, the CC 201 is required to output the instruction of establishing the connection only to the line response unit 203 at the source side only once. Conventionally, it is required to sequentially output an instruction for establishing a connection to the line response unit 203 at the source side and to the line response unit 203 at the destination side, output an instruction of storing downward UPC information to the line response unit 203 at the destination side, and output an instruction of storing upward UPC information to the line response unit 203 at the source side. That is, the total of four instruction outputs is required.

As described above, with the process of establishing a connection in the first preferred embodiment, the number of instruction outputs for establishing a connection from the CC 201 to the line response units 203 can be significantly reduced, thereby simplifying the process of establishing a connection.

Furthermore, since a communication of a connection control cell is performed using an ATM highway, the process of establishing a connection can be made faster.

If the result of establishing a connection in the line response unit 203 at the source side is "NG", for example, the microprocessor 204 in the line response unit 203 at the source side is required to halt transmission of the connection control cell to the line response unit 203 at the destination side, and return "NG" to the CC 201. On the contrary, if the microprocessor 204 in the line response unit 203 at the source side receives a connection control cell including the result of establishing a connection "NG" from the line response unit 203 at the destination side, it is required to return "NG" to the CC 201 after performing the process of releasing the connection in the line response unit 203 at the source side. After all, the CC 201 is only required to receive the result of establishing a connection from the microprocessor 204 in the line response unit 203 at the source side, thereby simplifying the process of establishing a connection.

Furthermore, since the communication of the connection control cell between the line response units 203 at the source and destination sides is performed using a VPI/VCI and tag information in a similar manner as in the case of transferring a subscriber cell in a connection currently being established, it can be simultaneously verified that a cell is properly exchanged between the line response units 203 at the source and destination sides via the ATM switch 202. The communication of the communication control cell is performed in a band of a connection currently being established using a VPI/VCI and tag information secured by the CC 201. Accordingly, the communication of the connection control cell may not affect a communication such as a communication of a subscriber cell, etc.

Provided below is the explanation about the process of releasing a connection in the first preferred embodiment.

Figure 7:
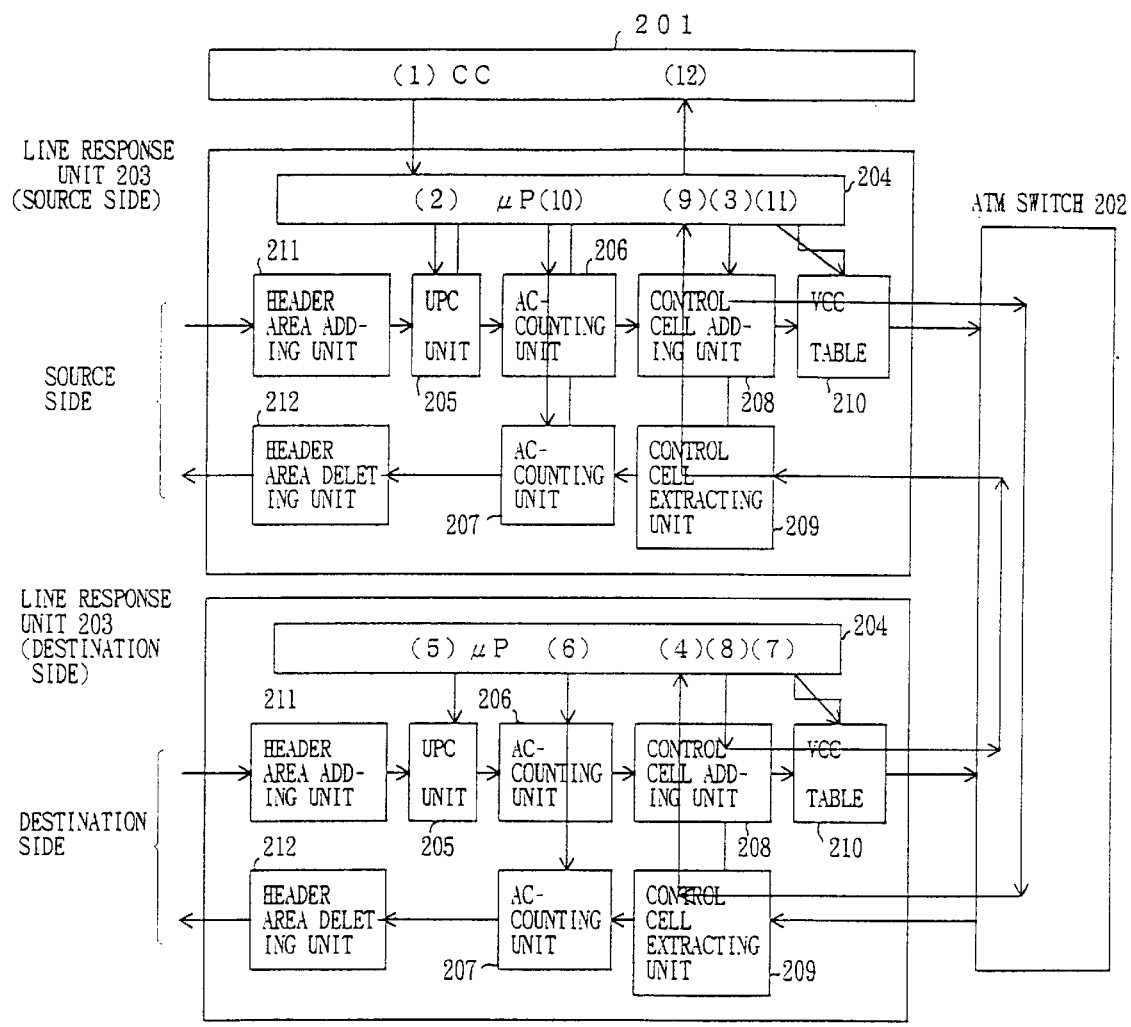
FIG. 7 is a block diagram showing a configuration of the first preferred embodiment of the present invention (No. 2)

FIG. 7 is a schematic showing the process of releasing a connection, and its configuration is the same as that of FIG. 3.

In this figure, the CC 201 transfers connection information composed of an input VPI, input VCI, output VPI, output VCI, upward tag information, downward tag information, and accounting read existence/non-existence identification information, and instruction for releasing a connection, to the microprocessor 204 in the line response unit 203 at the source side (FIG. 7 (1)).

A microprocessor 204 in the line response unit 203 at the source side which receives the connection information and the instruction for releasing the connection deletes upward UPC information included in the UPC unit 205 in the line response unit 203 at the source side corresponding to the input VPI/VCI (FIG. 7 (2)). As a result, an inflow of subscriber cells from the line at the source side to the ATM switch 202 is stopped, and a release of the connection is in a ready state.

The microprocessor 204 in the line response unit 203 at the source side transfers each piece of the connection information which must be notified to the line response unit 203 at the destination side, such as the input VPI, input VCI, output VPI, output VCI, downward tag information, and accounting read existence/non-existence identification information, to the control cell adding unit 208 in the line response unit 203 at the source side (FIG. 7 (3)). As a result, the control cell adding unit 208 generates a connection control cell including the above described connection information in its payload, and transmits it to the VCC table 210 in the line response unit 203 at the source side.

Figure 8:
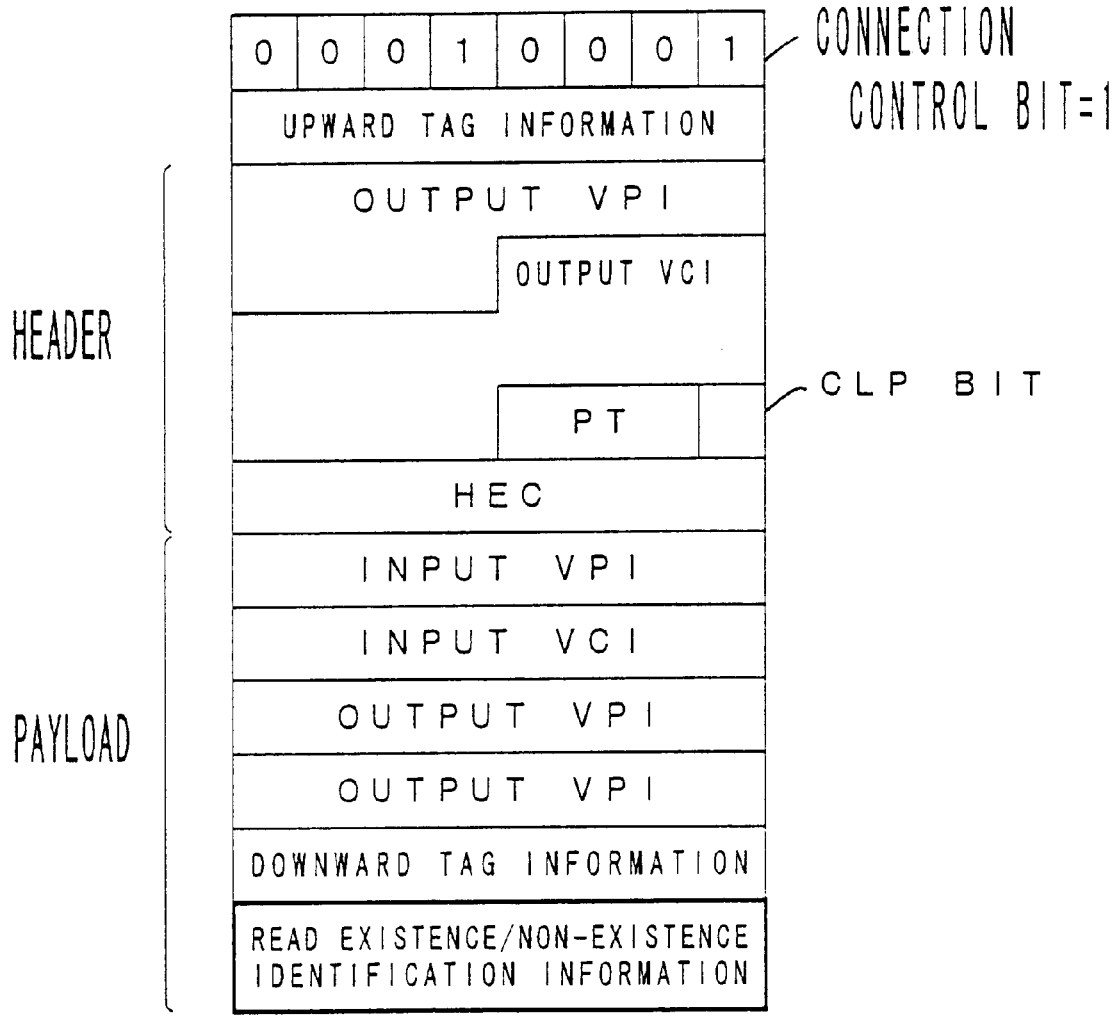
FIG. 8 shows a data format of the connection control cell transferred from the line response unit at the source side to the line response unit at the destination side when the connection is released.

FIG. 8 shows a data format of a connection control cell transmitted from the VCC table 210 in the line response unit 203 at the source side to the ATM switch 202, when a connection is released. The portion including a header, upward tag information, and a connection control bit is the same as that in the data format of the connection control cell transmitted from the VCC table 210 in the line response unit 203 at the source side to the ATM switch 202 shown in FIG. 6 when the connection is established.

The control cell extracting unit 209 in the line response unit 203 at the destination side extracts only a connection control cell to which the value of the connection control bit "1" is assigned, and transfers each piece of connection information stored in its payload such as an input VPI, input VCI, output VPI, output VCI, and accounting read existence/non-existence identification information, to the microprocessor 204 in the line response unit 203 at the destination side. (FIG. 7 (4)).

Then, the microprocessor 204 in the line response unit 203 at the destination side deletes the downward UPC information included in the UPC unit 205 in the line response unit 203 at the destination side corresponding to the received input VPI/VCI (FIG. 7 (5)). As a result, an inflow of subscriber cells from the line at the destination side to the ATM switch 202 is stopped.

If the received accounting read existence/non-existence identification information indicates a read operation of an accounting process, the microprocessor 204 in the line response unit 203 at the destination side reads a total flow of input cells, a flow of output OAM cells, and a flow of input cells with high priority from the accounting unit 206 in the line response unit 203 at the destination side, and also reads a total flow of output cells, a flow of output OAM cells, and a flow of output cells with high priority from the accounting unit 207 (FIG. 7 (6)). The total flow of input cells is defined as the number of normal subscriber cells input from the line to the ATM switch 202, while the total flow of output cells is defined as the number of normal subscriber cells output from the ATM switch 202 to the line. The flow of input OAM cells is defined as the number of OAM (Operation, Administration and Maintenance) cells such as an AIS cell input from the line to the ATM switch 202, to be described later, while the flow of output OAM cells is defined as the number of OAM cells output from the ATM switch 202 to the line. The OAM cell is distinct from other cells depending on the contents of a PT filed in a header of a cell. The flow of input cells with high priority is defined as the number of subscriber cells which are not readily discarded among subscriber cells input from the line to the ATM switch 202. The flow of output cells with high priority is defined as the number of subscriber cells which are not readily discarded among subscriber cells output from the ATM switch 202 to the line. A cell with high priority is distinct from a cell with low priority depending on a value of CLP bit in a header of the cell.

The microprocessor 204 in the line response unit 203 at the destination side then deletes the received input VPI, input VCI, and downward tag information stored at an address corresponding to the received output VPI/VCI in the VCC table 210 in the line response unit 203 at the destination side (FIG. 7 (7)).

Next, the microprocessor 204 in the line response unit 203 at the destination side transfers the result of releasing the connection which includes the input VPI, input VCI, output VPI, output VCI, downward tag information, total flow of input cells, flow of input OAM cells, flow of input cells with high priority, total flow of output cells, flow of output OAM cells, and flow of output cells with high priority, to the control cell adding unit 208 in the line response unit 203 at the destination side (FIG. 7 (8)). As a result, the control cell adding unit 208 generates a connection control cell whose payload includes the result of releasing the connection, and transmits the generated cell to the VCC table 210 in the line response unit 203 at the destination side.

Figure 9:
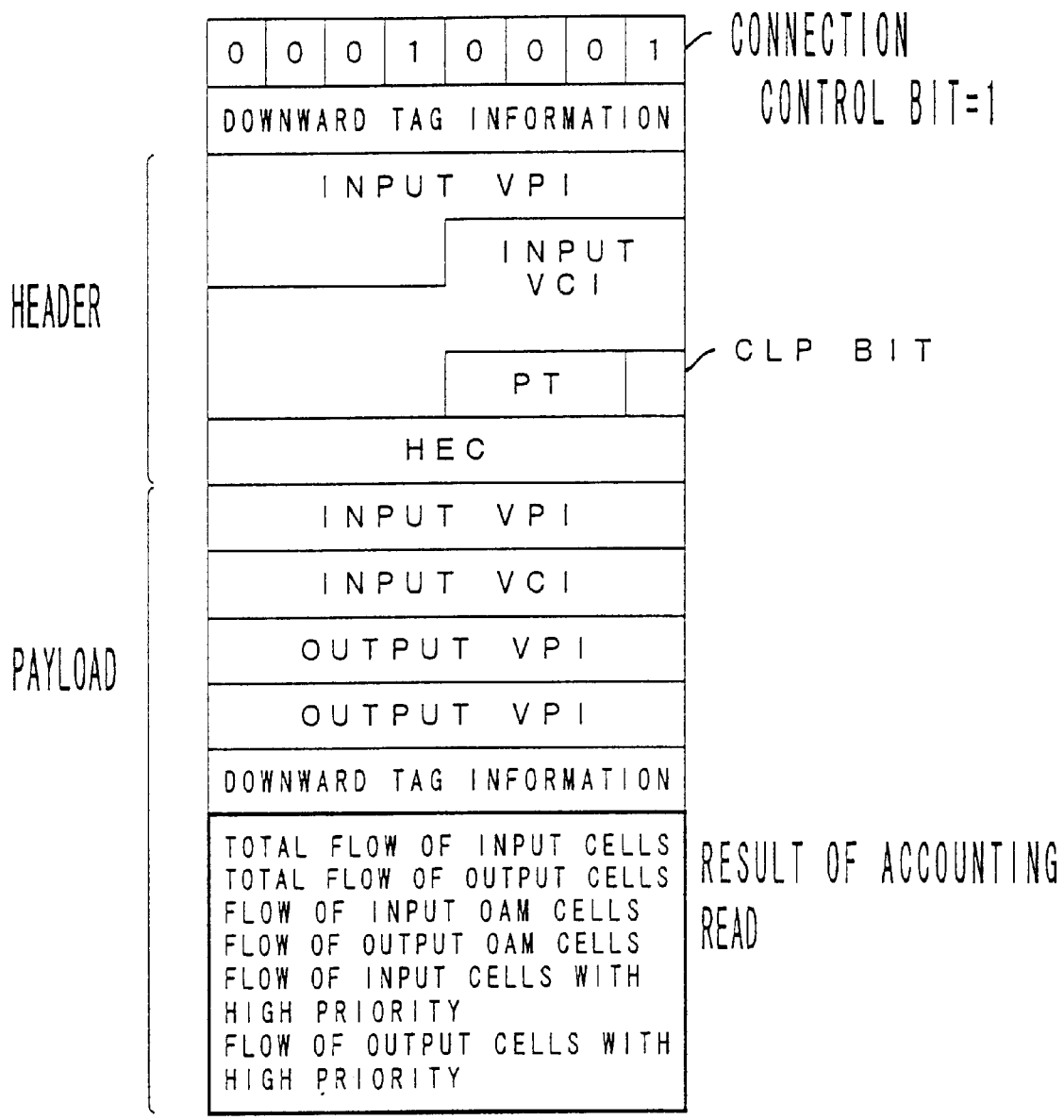
FIG. 9 shows a data format of the connection control cell transferred from the line response unit at the destination side to the line response unit at the source side when the connection is released.

FIG. 9 shows a data format of a connection control cell transmitted from the VCC table 210 in the line response unit 203 at the destination side to the ATM switch 202, when a connection is released. The portion including a header, downward tag information, and a connection control bit is the same as that in the data format of the connection control cell transmitted from the VCC table 210 in the line response unit 203 at the destination side to the ATM switch 202, when the connection is established.

The control cell extracting unit 209 in the line response unit 203 at the source side determines the value of the connection control bit at the beginning of a cell input from the ATM switch 202, extracts only the connection control cell to which the connection control bit value "1" is assigned, and transfers the result of releasing the connection included in its payload to the microprocessor 204 in the line response unit 203 at the source side (FIG. 7 (9)).

If the received accounting read existence/non-existence identification information received from the CC 201 indicates an accounting read, the microprocessor 204 in the line response unit 203 at the source side reads the total flow of input cells, flow of input OAM cells, and flow of input cells with high priority from the accounting unit 206 in the line response unit 203 at the source side, and also reads the total flow of output cells, flow of output OAM cells, and flow of output cells with high priority from the accounting unit 207 (FIG. 7 (10)).

The microprocessor 204 in the line response unit 203 at the source side then deletes the received output VPI, output VCI, and upward tag information stored at the address corresponding to the received input VPI/VCI in the VCC table 210 in the line response unit 203 at the source side (FIG. 7 (11)).

Lastly, the microprocessor 204 in the line response unit 203 at the source side notifies the CC 201 of the result of releasing the connection received from the line response unit 203 at the destination side, which includes the received total flow of input cells, flow of input OAM cells, flow of input cells with high priority, total flow of output cells, flow of output OAM cells, and a flow of output cells with high priority, in addition to the result of releasing the connection read from the accounting units 206 and 207 in the line response unit 203 at the source side, which includes the total flow of input cells, flow of input OAM cells, flow of input cells with high priority, total flow of output cells, flow of output OAM cells, and flow of output cells with high priority.

(FIG. 7 (12)).

In the above described process of releasing a connection in the first preferred embodiment of the present invention, the CC 201 is required to output the instruction of establishing a connection (FIG. 7 (1)) once only to the line response unit 203 at the source side. Conventionally, it is required to output an instruction of deleting connection information both in the UPC unit and in the VCC table to the line response unit at the source side, output this instruction to the line response unit at the destination side, output an instruction of reading data in the accounting unit to the line response unit at the destination side, and output this instruction to the line response unit 203 at the source side. That is, the total of four instruction outputs is required. Thus, even in the process of releasing a connection in the first preferred embodiment, the number of instruction outputs for establishing a connection from the CC 201 to the line response unit 203 can be significantly reduced. As a result, the process of releasing a connection can be simplified and made faster.

Second Preferred Embodiment

FIG. 10 is a block diagram showing a configuration of the second preferred embodiment of the present invention, based on the configuration of the ATM switch shown in FIG. 2.

In this figure, the portions with the same reference numerals as those in the first preferred embodiment of the present invention shown in FIG. 3 have the same capabilities.

In FIG. 10, OAM cell process units 1001 and 1002 are respectively arranged between the header area adding unit 211 and the UPC unit 205, and between the accounting unit 207 and the header area deleting unit 212, in addition to the configuration of FIG. 3.

Generally, if a fault is detected in a specific PVC (Permanent Virtual Channel) connection in one ATM switch in an ATM network, the close process of stopping an inflow of subscriber cells in the specific connection must be performed in each of the UPC units 205 in the line response units 203 at the source and destination sides in association with the specific connection. Additionally, each of the line response units 203 at the source and destination sides must transmit a cell called an AIS (Alarm Indication Signal) cell for notifying that the fault associated with that connection occurs, to each of the lines at the source and destination sides. The switch which receives the AIS cell relays this cell to the lines at the source and destination sides, and at the same time, recognizes that the connection corresponding to the VPI/VCI included in the AIS cell is closed. Thus, a connection where a fault occurs can be quickly closed. A cell for operation and maintenance such as an AIS cell, etc. is called an OAM (Operation, Administration, and Maintenance) cell, and a process of controlling a communication of the OAM cell is called an OAM cell process.

In the second preferred embodiment of the present invention described below, the above described close process and a process of transmitting an AIS cell are implemented by one close request output from the CC 201 to the line response unit 203 at the source side.

If a fault is detected in a specific PVC connection, the CC 201 outputs connection information composed of an input VPI, an input VCI, an output VPI, an output VCI corresponding to the specific connection, and a close request to the microprocessor 204 in the line response unit 203 at the source side in association with the specific connection (FIG. 10 (1)).

The microprocessor 204 which receives the connection information and the close request replaces a value of upward UPC information included in the UPC unit 205 in the line response unit 203 at the source side corresponding to the above described input VPI/VCI with a value stopping an inflow of subscriber cells having this input VPI/VCI (FIG. 10 (2)). As a result, the inflow of subscriber cells having that VPI/VCI from the line at the source side to the ATM switch 202 is stopped, and the connection corresponding to the input VPI/VCI is closed.

Then, the microprocessor 204 in the line response unit 203 at the source side transfers the above described output VPI/VCI included in the connection information and the close instruction, which must be notified to the line response unit 203 at the destination side, to the control cell adding unit 208 in the line response unit 203 at the source side (FIG. 10 (3)). As a result, the control cell adding unit 208 generates a connection control cell including the connection information in its payload, and transmits it to the VCC table 210 in the line response unit 203 at the source side.

The portion including a header, upward tag information and a connection control bit is the same as that in the data format of the connection control cell transmitted from the VCC table 210 in the line response unit 203 at the source side to the ATM switch 202 in the process of establishing a connection in the first preferred embodiment of the present invention, shown in FIG. 6.

In the meantime, the control cell extracting unit 209 in the line response unit 203 at the destination side extracts only the connection control cell to which the connection control bit value "1" is assigned, and transfers each piece of the connection information such as the output VPI, the output VCI, and the close instruction information included in its payload, to the microprocessor 204 in the line response unit 203 at the destination side (FIG. 10 (4)).

The microprocessor 204 in the line response unit 203 at the destination side instructs the OAM cell process unit 1002 in the line response unit 203 at the destination side to transmit an AIS cell associated with a connection corresponding to the received output VPI/VCI (FIG. 10 (5)). As a result, the OAM cell process unit 1002 transmits the AIS cell where its header includes the output VPI/VCI, and the PT field of the header includes a value identifying it as an AIS cell, to the line at the destination side at a timing of an empty cell into which a subscriber cell is not inserted.

Then, the microprocessor 204 in the line response unit 203 at the destination side replaces the value of the downward UPC information included in the UPC unit 205 in the line response unit 203 at the destination side corresponding to the output VPI/VCI with the value stopping the inflow of subscriber cells having the output VPI/VCI (FIG. 10 (6)). As a result, the inflow of subscriber cells from the line at the destination side to the ATM switch 202 is stopped, and the connection corresponding to the output VPI/VCI is closed.

Next, the microprocessor 204 in the line response unit 203 at the destination side transfers the connection information to be notified to the line response unit 203 at the source side, composed of the output VPI, the output VCI, and a notification of completion of the close operation, to the control cell adding unit 208 in the line response unit 203 at the destination side (FIG. 10 (7)). As a result, the control cell adding unit 208 generates a connection control cell including the above described connection information in its payload, and transmits the generated cell to the VCC table 210 in the line response unit 203 at the destination side.

The portion including the header, the downward tag information, and the connection control bit is the same as that in the data format of the connection control cell transmitted from the VCC table 210 in the line response unit 203 at the destination side to the ATM switch 202 in the process of establishing a connection in the first preferred embodiment of the present invention.

The control cell extracting unit 209 in the line response unit 203 at the source side determines the value of the connection control bit at the beginning of the cell input from the ATM switch 202, extracts only the connection control cell to which the connection control bit value "1" is assigned, and transfers the output VPI, the output VCI, and the notification of completion of the close operation included in its payload, to the microprocessor 204 in the line response unit 203 at the source side (FIG. 10 (8)).

The microprocessor 204 in the line response unit 203 at the source side instructs the OAM cell process unit 1002 in the line response unit 203 at the source side to transmit an AIS cell associated with the connection currently being closed, corresponding to the input VPI/VCI (FIG. 10(9)). As a result, the OAM cell process unit 1002 transmits the AIS cell where the input VPI/VCI is included in its header, and the value identifying it as an AIS cell is included in the PT field of the header, to the line at the source side at a timing of an empty cell into which a subscriber cell is not inserted.

Lastly, the microprocessor 204 in the line response unit 203 at the source side transmits the input VPI, the input VCI, the output VPI, and the output VCI of the connection currently being closed, and the notification of having completed the close operation of the connection, to the CC 201 (FIG. 10(10)).

The OAM cell process unit 1001 in each of the line response units 203 detects an AIS cell input from each of the lines, and notifies the CC 201 of the detection of the AIS cell, so that the CC 201 can recognize an occurrence of a fault in the connection corresponding to the input VPI/VCI included in the AIS cell.

In the above described OAM process in the second preferred embodiment, the CC 201 outputs the close request only to the line response unit 203 at the source side, thereby implementing the close process and the process of transmitting an AIS cell in the line response units 203 at the source and destination sides. As a result, a high-speed close process of a connection can be implemented.

Third Preferred Embodiment

Figure 11:
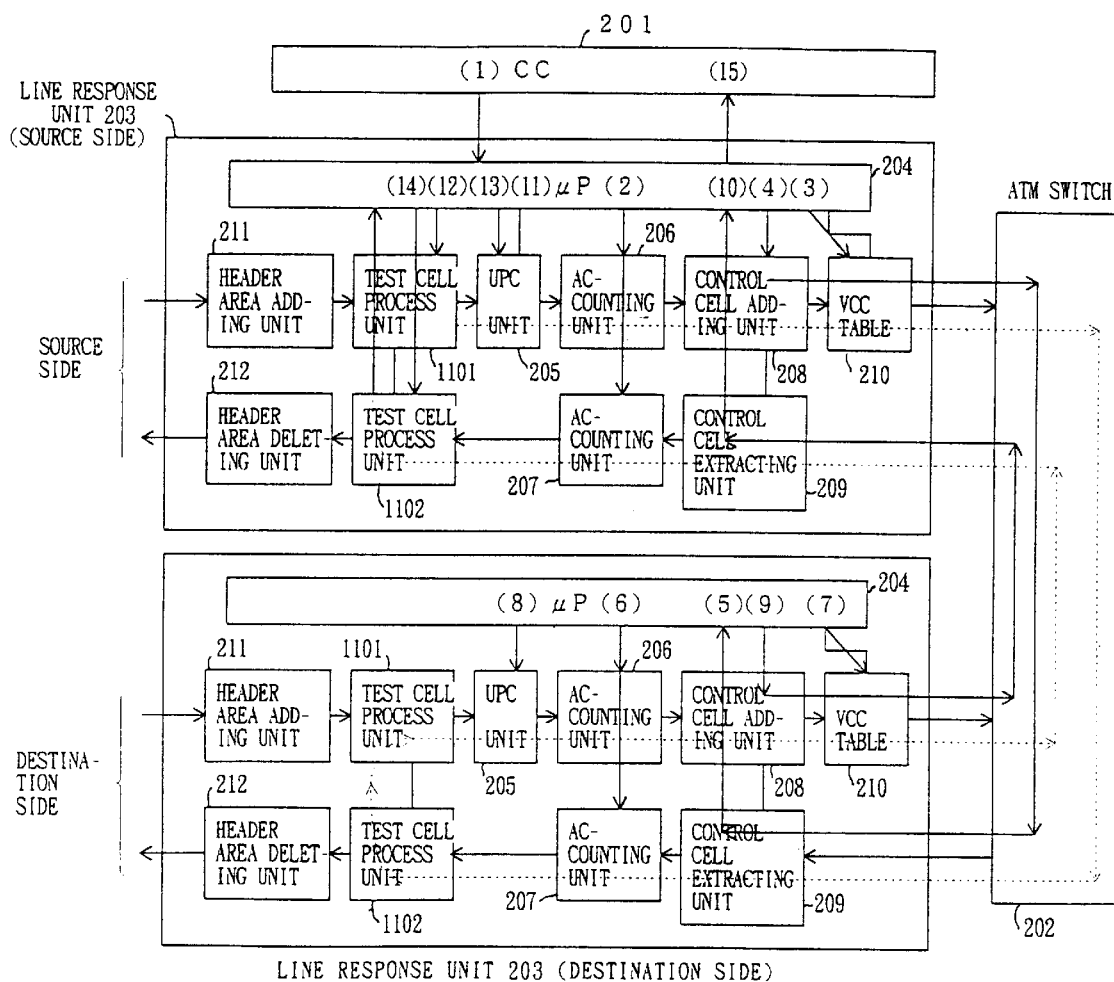
FIG. 11 is a block diagram showing a configuration of the third preferred embodiment of the present invention.

FIG. 11 shows a configuration of the third preferred embodiment of the present invention, based on the configuration of the ATM switch shown in FIG. 2. In this figure, the portions having the same reference numerals as those in the first preferred embodiment of the present invention shown in FIG. 3 have the same capabilities.

In this figure, test cell process units 1101 and 1102 are respectively arranged between the header area adding unit 211 and the UPC unit 205, and between the accounting unit 207 and the header area deleting unit 212, in addition to the configuration shown in FIG. 3.

In this preferred embodiment, the process of establishing a connection, which is similar to that performed in the first preferred embodiment of the present invention, is performed specifically when an automatic test is requested to be carried out.

In this process of establishing a connection, the portion of the process performed in (1) through (11) in FIG. 11 is the same as that performed in (1) through (11) in FIG. 3.

The microprocessor 204 in the line response unit 203 at the source side stores upward UPC information received from the CC 201 in the UPC unit 205 in the line response unit 203 at the source side (FIG. 11 (11)), and instructs the test cell process unit 1102 in the line response unit 203 at the source side to receive the test cell including the input VPI/VCI received from the CC 201 (FIG. 11 (12)).

Figure 12:
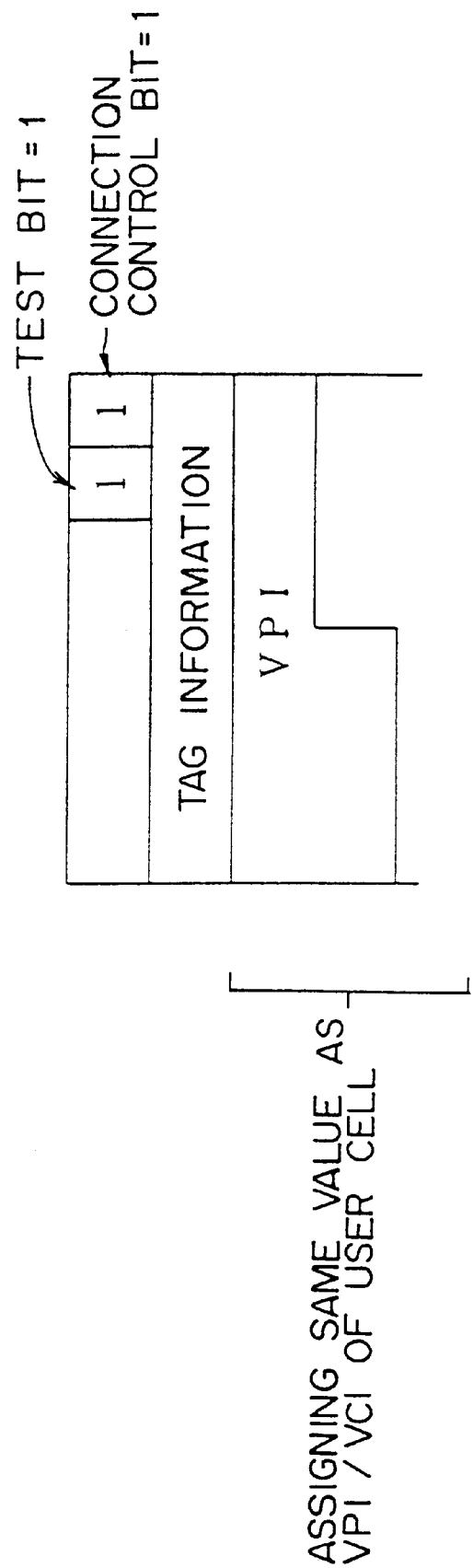
FIG. 12 shows a structure of a header of a test cell.

Then, the microprocessor 204 in the line response unit 203 at the source side instructs the test cell process unit 1101 in the line response unit 203 at the source side to transmit the test cell including the input VPI/VCI received from the CC 201 (FIG. 11 (13)). As a result, the test cell process unit 1101 transmits the test cell where its header includes the above described input VPI/VCI, and the value "1" is assigned to an empty bit at the beginning as a test bit, as shown in FIG. 12, to the UPC unit 205 in the line response unit 203 at the source side.

In the VCC table 210 in the line response unit 203 at the source side, the address corresponding to the input VPI/VCI included in the above described test cell is accessed, and the output VPI, the output VCI, and the upward tag information at that address stored by the process of establishing a connection, are read. Then, the input VPI/VCI included in the test cell is replaced with the read output VPI/VCI, and the read upward tag information is added to the beginning of the cell. The test cell with the added upward tag information is self-routed from the ATM switch 202 to the line response unit 203 at the destination side.

In the meantime, the test cell process unit 1102 in the line response unit 203 at the destination side determines the value of the test bit at the beginning of the input cell, outputs a normal subscriber cell to which the test bit value "0" is assigned to the header area deleting unit 212, and extracts only the test cell to which the test bit value "1" is assigned. This test cell is then transmitted to the test cell process unit 1101 in the line response unit 203 at the destination side as it is, and again transmitted to the UPC unit 205 in the line response unit 203 at the destination side, toward the ATM switch 202.

In the VCC table 210 in the line response unit 203 at the destination side, the address corresponding to the output VPI/VCI included in the above described test cell is accessed, and the input VPI, the input VCI, and the downward tag information at that address stored by the process of establishing a connection are read. The output VPI/VCI included in the test cell is replaced with the read input VPI/VCI, and the read downward tag information is added to the beginning of the cell. The test cell with the added downward tag information is self-routed from the ATM switch 202 to the line response unit 203 at the source side.

The test cell process unit 1102 in the line response unit 203 at the source side determines the value of the test bit at the beginning of the input cell, outputs a normal subscriber cell to which the test bit value "0" is assigned to the header area deleting unit 212 as it is, and extracts only the test cell to which the test bit value "1" is assigned. Then, the test cell process unit 1102 notifies the microprocessor 204 in the line response unit 203 at the source side of the reception of the test cell (FIG. 3 (14)).

Lastly, the microprocessor 204 in the line response unit 203 at the source side notifies the CC 201 of the result of the process of establishing a connection and the result of an automatic test (FIG. 3 (15)).

According to the above described third preferred embodiment, an automatic test of a connection between the line response units 203 at the source and destination sides can be carried out while the process of establishing a connection is being performed, by equipping the test cell process units 1101 and 1102 with enhanced capabilities such as a time measurement capability, etc.

Fourth Preferred Embodiment

FIG. 13 is a block diagram showing a configuration of the fourth preferred embodiment of the present invention, based on the configuration of the ATM switch shown in FIG. 2. In this figure, the portions having the same reference numerals as those in the first and third preferred embodiments respectively shown in FIGS. 3 and 11 have the same capabilities.

With the configuration of the fourth preferred embodiment of the present invention shown in FIG. 13, the automatic test capability implemented by the configuration of the third preferred embodiment of the present invention shown in FIG. 11 is voluntarily and periodically performed in the line response unit 203 at the source side.

That is, if the CC 201 specifies a periodic automatic test for the microprocessor 204 in the line response unit 203 at the source side, a clock 1301 in the line response unit 203 at the source side notifies the microprocessor 204 in the line response unit 203 at the source side of an elapsed time (FIG. 13 (1)). Each time a VPI/VCI extracting unit 1302 is notified of registered input VPI/VCI extracted from the VCC table 210 in the line response unit 203 at the source side (FIG. 13(2)), the microprocessor 204 in the line response unit 203 at the source side instructs the test cell process unit 1102 to receive the test cell including the input VPI/VCI (FIG. 13 (3)).

The microprocessor 204 in the line response unit 203 at the source side then instructs the test cell process unit 1101 in the line response unit 203 at the source side to transmit the test cell including the input VPI/VCI. (FIG. 13 (4)). As a result, the test cell process unit 1101 transmits the test cell where its header includes the input VPI/VCI, and the value "1" is assigned to an empty bit at the beginning as the test bit to the UPC unit 205 in the line response unit 203 at the source side.

The transmitted test cell is doubled back at the test cell process units 1102 and 1101 in the line response unit 203 at the destination side, and returned to the line response unit 203 at the source side.

After the test cell process unit 1102 in the line response unit 203 at the source side extracts the test cell, it notifies the microprocessor 204 in the line response unit 203 at the source side of the reception of the test cell (FIG. 13 (5)).

The microprocessor 204 in the line response unit 203 at the source side examines a communication quality of each connection corresponding to each input VPI/VCI, by measuring a performance associated with an exchange state of the test cell.

Fifth Preferred Embodiment

Provided below is the explanation about the fifth preferred embodiment of the present invention.

The configuration of each of the line response units 203 in the fifth preferred embodiment is similar to that of the first preferred embodiment of the present invention shown in FIG. 3.

According to the fifth preferred embodiment, the process of establishing/releasing a connection corresponding to a point-to-multipoint connection can be implemented.

Generally, in the point-to-multipoint connection, a cell to which a pair of VPI/VCI is attached in the line response unit 203 at the source side is copied in the ATM switch 202. Each of a plurality of the copied cells is routed to each of the line response units 203, and output from each of the line response units 203 at the destination side to a plurality of lines.

Accordingly, a mechanism for notifying the connection control cell from the line response unit 203 at the source side to each of the plurality of the line response units 203 at the destination side, described in the first preferred embodiment, becomes necessary.

Figure 14:
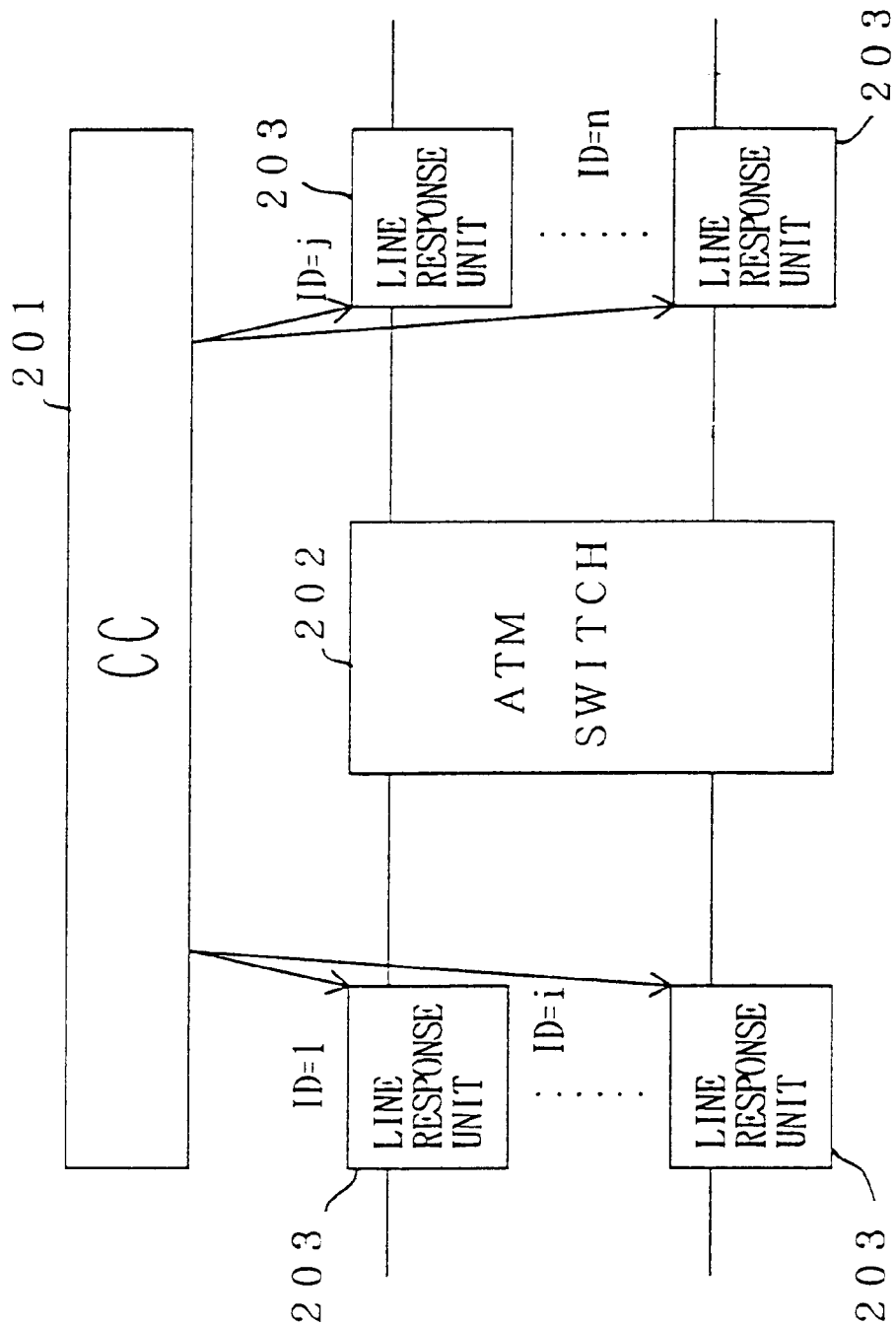
FIG. 14 is a block diagram showing a configuration of the fifth preferred embodiment of the present invention.

To implement this mechanism, the CC 201 attaches a unique ID to all of the line response units 203 in the ATM switch that the CC 201 manages according to the fifth preferred embodiment as shown in FIG. 14.

Figure 15:
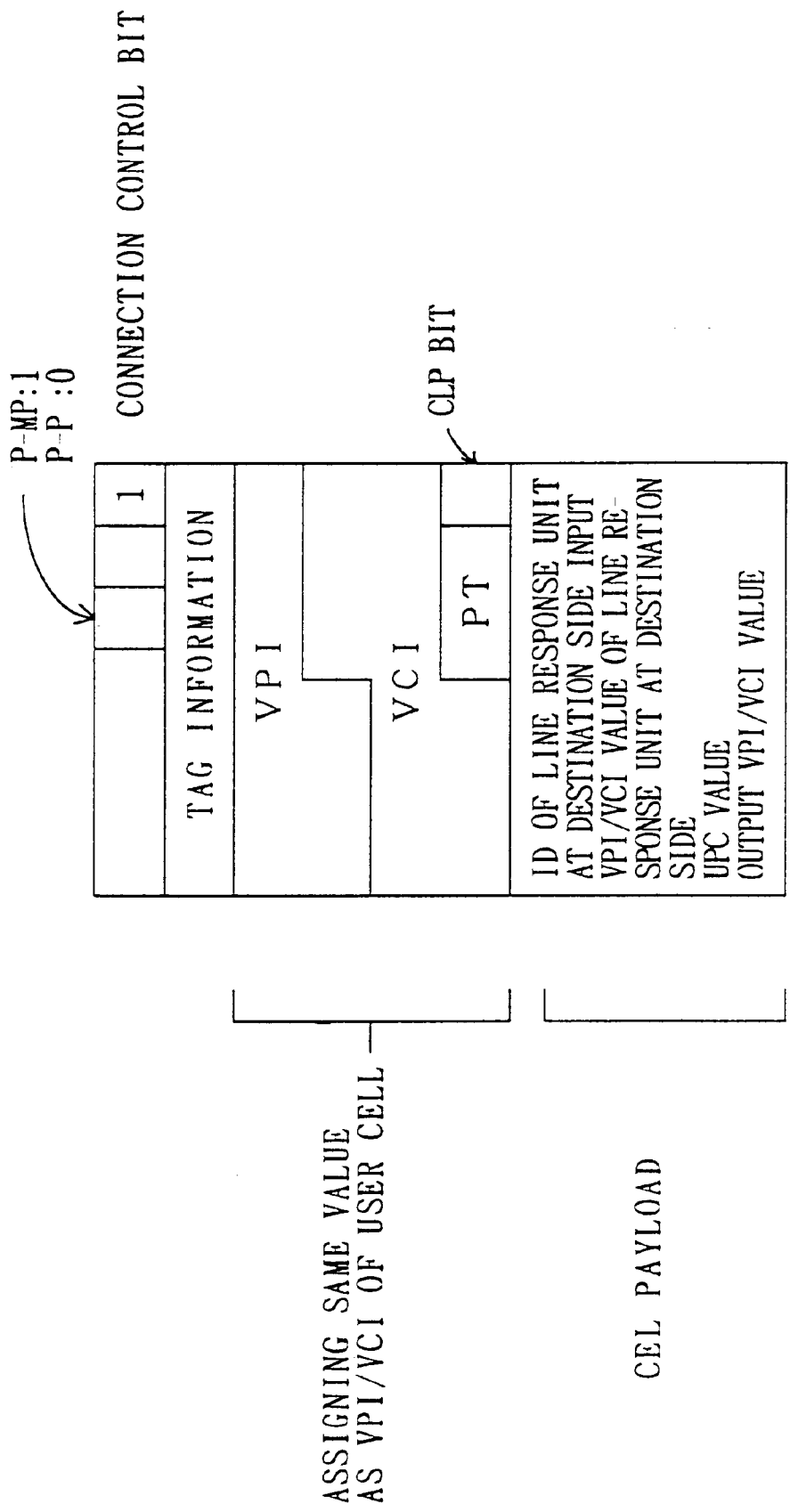
FIG. 15 shows a data format of the connection control cell transferred from the line response unit at the source side to the line response unit at the destination side in the fifth preferred embodiment of the present invention.

When transmitting a connection control cell, the control cell adding unit 208 in the line response unit 203 at the source side (see FIG. 3) adds information indicating whether the cell is either a cell for a point-to-point (P—P) connection or a cell for a point-to-multipoint (P-MP) connection, to an empty bit at the beginning of the cell, stores an ID of the line response unit 203 at the destination side in addition to each piece of the connection information described in the first preferred embodiment in its payload, and transmits the cell, as shown in FIG. 15.

The control cell extracting unit 209 in the line response unit 203 at the destination side (see FIG. 3) notifies the microprocessor 204 in the line response unit 203 at the source side of the connection information stored in the payload of the cell when receiving the cell, if the information indicating the point-to-multipoint connection is stored at the beginning of the cell and the ID indicating the line response unit 203 is stored in the payload of the cell.

Subsequent operations are the same as those in the first preferred embodiment.

Note that a return of the connection control cell from each of the line response units at the destination side to the line response unit 203 at the source side is performed by directly specifying the line response unit 203 at the source side, in a similar manner as in the first preferred embodiment.

Sixth Preferred Embodiment

In the above described first through fifth preferred embodiments, the connection information exchanged between the line response unit 203 at the source side and the line response unit 203 at the destination side is stored in a payload of a connection control cell.

Figure 16:
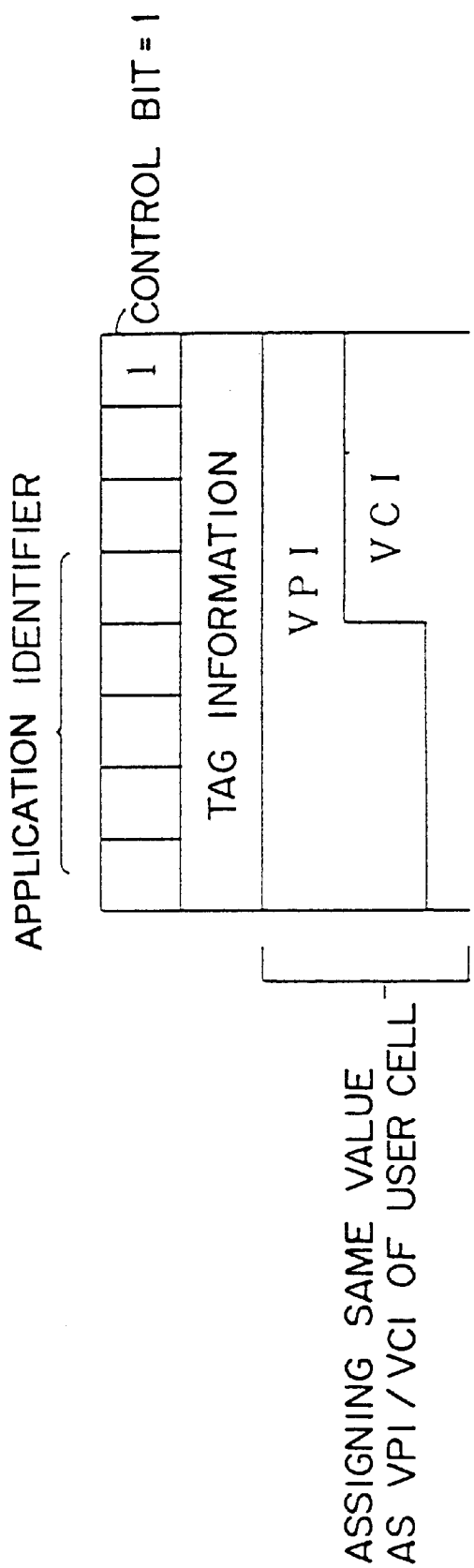
FIG. 16 shows a data format of the connection control cell exchanged between the line response units at the source and destination sides in the sixth preferred embodiment of the present invention.

While in the sixth preferred embodiment, the connection information is added as an application identifier to an empty bit at the beginning of a normal subscriber cell to exchange between the line response unit 203 at the source side and the line response unit 203 at the destination side, as shown in FIG. 16.

What is claimed is:

1. A connection control method for use in a switch where a fixed-length cell input from a first or second line via a first or second line response unit is transferred to the second or first line as opposed to the first or second line via the second or first line response unit as opposed to the first or second line response unit, by being self-switched in the switch, according to routing information which is set in a header and added to the fix length cell, comprising the steps of:

transmitting a connection control cell where connection identification information corresponding to a specified connection is set, routing information indicating a route to the second or first line response unit as opposed to the first or second line response unit is set in the header, connection control information identifying it as the connection control cell is set in an empty area of the header, and connection information for controlling the specified connection is stored, to the switch by the first or second line response unit;

extracting the connection control cell reciprocally by the first and second line response units input from the switch according to the connection control information; and starting inflow of subscriber cells corresponding to the specified connection from the first line or the second line according to the connection information in the extracted connection control cell by the first line response unit or second line response unit.

2. The connection control method as set forth in claim 1, wherein:

the first and second line response units are implemented by line response units on source and destination sides;

said transmitting step transmits the connection control cell storing connection information for controlling the specified connection, reciprocally by the line response units on the source and destination sides; and said extracting step extracts the connection control cell based on the connection control information, reciprocally by the line response units on the source and destination sides.

3. A connection establishment method for use in a switch where a fixed-length cell input from a first or second line via a first or second line response unit is transferred to the second or first line as opposed to the first or second line via the second or first line response unit as opposed to the first or second line response unit, by being self-switched in the switch, according to routing information which is set in a header and added to the fixed-length cell, comprising the steps of:

establishing a specified connection in a station where an inflow of subscriber cells corresponding to the specified connection from the first line is stopped, by means of the first line response unit;

transmitting a connection control cell where connection identification information corresponding to the specified connection is set, routing information indicating a route to the second line response unit as opposed to the first line response unit is set in the header, connection control information identifying it as the connection control cell is set in an empty area of the header, and connection information for establishing the specified connection is stored, to the switch by means of the first line response unit that establishes the specified connection;

extracting the connection control cell which is transmitted from the first line response unit as opposed to the second line response unit and input from the switch, according to the connection control information, by the second line response unit;

establishing the specified connection according to the connection information stored in the extracted connection control cell, by means of the second line response unit;

starting the inflow of the subscriber cells corresponding to the specified connection from the second line, according to the connection information stored in the extracted connection control cell, by means of the second line response unit;

transmitting the connection control cell where the connection identification information corresponding to the specified connection is set, routing information indicating a route to the first line response unit as opposed to the second line response unit is set in the header, the connection control information identifying it as the connection control cell is set in the empty area of the header, and the connection information indicating a result of establishing the specified connection is stored, to the switch by means of the second line response unit;

extracting the connection control cell which is transmitted from the second line response unit as opposed to the first line response unit according to the connection control information, by means of the first line response unit; and starting the inflow of the subscriber cells corresponding to the specified connection from the first line according to the connection information stored in the extracted connection control cell, by means of the first line response unit.

4. A connection test method for use with the connection establishment method as set forth in claim 3, comprising the steps of:

transmitting a test cell where the connection identification information corresponding to the specified connection is set, routing information indicating the route to the second line response unit as opposed to the first line response unit is set in the header, and test cell identification information identifying it as the test cell is attached, to the switch, after starting the inflow of the subscriber cell corresponding to the specified connection from the first line, by means of the first line response unit;

extracting the test cell which is transmitted from the first line response unit as opposed to the second line response unit and input from the switch according to the test cell identification information, by means of the first line response unit; and testing the specified connection based on a relationship between the transmitted test cell and the extracted test cell, by means of the first line response unit.

5. The connection establishment method as set forth in claim 3, wherein:

when the fixed-length cell including the connection identification information, input from the first line via the first line response unit, is transferred to a plurality of second lines as opposed to the first line via a plurality of second line response units as opposed to the first line response unit, by being self-switched and copied in the switch according to the routing information which is set in the overhead and added to the fixed-length cell, the first line response unit stores line response unit identification information for identifying one of the plurality of second line response units as opposed to the first line response unit in the connection control cell, when transmitting the connection control cell to the switch; and the second line response unit extracts the connection control cell which is transmitted from the first line response unit as opposed to the second line response unit, according to the connection control information and the line response unit identification information.

6. A connection release method for use in a switch where a fixed-length cell input from a first or second line via a first or second line response unit is transferred to the second or first line as opposed to the first or second line via the second or first line response unit as opposed to the first or second line response unit, by being self-switched in the switch, according to routing information which is set in a header and added to the fixed-length cell, comprising the steps of:

stopping an inflow of subscriber cells corresponding to a specified connection from the first line, by means of the first line response unit;

transmitting a connection control cell where connection identification information corresponding to the specified connection is set, routing information indicating a route to the second line response unit as opposed to the first line response unit is set in the header, connection control information identifying it as the connection control cell is set in an empty area of the header, and connection information for releasing the specified connection is stored, to the switch by means of the first line response unit;

extracting the connection control cell which is transmitted from the first line response unit as opposed to the second line response unit and input from the switch, according to the connection control information, by means of the second line response unit;

stopping the inflow of the subscriber cells corresponding to the specified connection from the second line according to the connection information stored in the extracted connection control cell, by means of the second line response unit;

releasing the specified connection according to the connection information stored in the extracted connection control cell, by means of the second line response unit;

transmitting the connection control cell where connection identification information corresponding to the specified connection is set, the routing information indicating a route to the first line response unit as opposed to the second line response unit is set in the header, the connection control information identifying it as the connection control cell is set in the empty area of the header, and the connection information indicating a result of releasing the specified connection is stored, to the switch by means of the second line response unit;

extracting the connection control cell which is transmitted from the second line response unit as opposed to the first line response unit and input from the switch according to the connection control information, by means of the first line response unit; and releasing the specified connection according to the connection control cell, by means of the first line response unit.

7. The connection release method as set forth in claim 6, wherein:

the second line response unit stops an accounting process in the second line response unit, and transmits the connection control cell which stores a result of the accounting process as a portion of the connection information indicating the result of releasing the specified connection, to the switch, after releasing the specified connection; and the first line response unit stops an accounting process in the first line response unit, and outputs a result of the accounting process in addition to the result of the accounting process in the second line response unit, which is notified by the connection control cell, after releasing the specified connection.

8. The connection release method as set forth in claim 6, wherein:

when the fixed-length cell including the connection identification information, input from the first line via the first line response unit, is transferred to a plurality of second lines as opposed to the first line via a plurality of second line response units as opposed to the first line response unit, by being self-switched and copied in the switch according to the routing information which is set in the overhead and added to the fixed-length cell, the first line response unit stores line response unit identification information for identifying one of the plurality of second line response units as opposed to the first line response unit in the connection control cell, when transmitting the connection control cell to the switch; and the second line response unit extracts the connection control cell which is transmitted from the first line response unit as opposed to the second line response unit, and input from the switch, according to the connection control information and the line response unit identification information.

9. A connection close method for use in a switch where a fixed-length cell input from a first or second line via a first or second line response unit is transferred to the second or first line as opposed to the first or second line via the second or first line response unit as opposed to the first or second line via the second or first line response unit as opposed to the first or second line response unit, by being self-switched in the switch to routing information which is set in a header and added to the fixed-length cell, comprising the steps of:

stopping an inflow of subscriber cells corresponding to a specified connection from the first line, by means of the first line response unit;

transmitting a connection control cell where connection identification information corresponding to the specified connection is set, routing information indicating a route to the second line response unit as opposed to the first line response unit is set in the header, connection control information identifying it as the connection control cell is set in an empty area of the header, and connection information for releasing the specified connection is stored, to the switch by means of the first line response unit;

extracting the connection control cell which is transmitted from the first line response unit as opposed to the second line response unit according to the connection control information, by means of the second line response unit;

stopping the inflow of the subscriber cells corresponding to a specified connection from the second line according to the connection information stored in the extracted connection control cell, by means of the second line response unit;

transmitting an alarm indication cell where the connection identification information corresponding to the specified connection is set, and an alarm indication indicating an occurrence of a fault associated with the specified connection is stored, to the second line, by means of the second line response unit;

transmitting a connection control cell where the connection identification information corresponding to the specified connection is set, routing information indicating a route to the first line response unit as opposed to the second line response unit as opposed to the second line response unit is set in the header, the connection control information identifying it as the connection control cell is set in an empty area of the header, and the connection information indicating a result of releasing the specified connection, to the switch by means of the second line response unit;

extracting the connection control cell which is transmitted from the second line response unit as opposed to the first line response unit and input from the switch according to the connection control information, by means of the first line response unit; and transmitting the alarm indication cell where the connection identification information corresponding to the specified connection is set, and the alarm indication indicating the occurrence of the fault associated with the specified connection is stored, to the first line according to the connection information stored in the extracted connection control cell, by means of the first line response unit.

10. A connection test method for use in a switch where a fixed-length cell input from a first or second line via a first or second line response unit is transferred to the second or first line as opposed to the first or second line via the second or first line response unit as opposed to the first or second line response unit, by being self-switched in the switch according to routing information which is set in an overhead and added to the fixed-length cell, comprising the steps of:

transmitting a test cell where connection identification information corresponding to a specified connection is set, routing information indicating a route to the second line response unit as opposed to the first line response unit is set in the header, and test cell identification information identifying it as the test cell is attached, to the switch for each specified connection set in the first line response unit at predetermined intervals, by means of the first line response unit;

extracting the test cell which is transmitted from the first line response unit as opposed to the second line response unit and input from the switch according to the test cell identification information, by means of the second line response unit;

returning the extracted test cell to the switch after setting routing information indicating a route to the first line response unit as opposed to the second line response unit in its header, by means of the second line response unit;

extracting the test cell which is transmitted from the second line response unit as opposed to the first line response unit and input from the switch according to the test cell identification information, by means of the first line response unit; and testing the specified connection based on a relationship between the transmitted test cell and the extracted test cell, by means of the first line response unit.

11. A connection control system for use with a switch where a fixed-length cell input from a first or second line via a first or second line response unit is transferred to the second or first line as opposed to the first or second line via the second or first line response unit as opposed to the first or second line response unit, by being self-switched in the switch according to routing information which is set in a header and added to the fixed-length cell, wherein:

the first or second line response unit, comprising connection control cell transmitting means for transmitting a connection control cell where the connection identification information corresponding to a connection to be controlled is set, routing information indicating a route to the second or first line response unit as opposed to the first or second line response unit in the header, and connection control information identifying as the connection control cell is set in an empty area of the header, and the connection information is stored, to the switch;

connection control cell extracting means for extracting the connection control cell which is transmitted from the second or first line response unit and input from the switch; and means for starting inflow of subscriber cells corresponding to the connection from the first line or the second line according to the connection information in the extracted connection control cell.

12. A line response unit for use with a switch where a fixed-length cell inputted from a first or second line via a first or second line response unit each of which is corresponding to said line response unit is transferred to the second or first line as opposed to the first or second line via the second or first line response unit as opposed to the first or second line response unit, by being self-switched in the switch according to routing information which is set in a header and added to the fixed-length cell, comprising connection control cell transmitting means for transmitting a connection control cell where the connection identification information corresponding to a connection to be controlled is set, routing information indicating a route to the second or first line response unit as opposed to the first or second line response unit in the header, and connection control information identifying as the connection control cell is set in an empty area of the header, and the connection information is stored, to the switch;

connection control cell extracting means for extracting the connection control cell which is transmitted from the second or first line response unit and input from the switch; and means for starting inflow of subscriber cells corresponding to the connection from the first line or the second line according to the connection information in the extracted connection control cell.

13. A connection control unit for use in a switch where a fixed-length cell input from a first or second line via a first or second line response unit is transferred to the second or first line as opposed to the first or second line via the second or first line response unit as opposed to the first or second line response unit, by being self-switched in the switch, according to routing information which is set in a header and added to the fixed-length cell, comprising the means of:

the cell transmitting means, accommodated in the first or second line response unit, for transmitting a connection control cell where connection identification information corresponding to a specified connection is set, routing information indicating a route to the second or first lien response unit as opposed to the first or second line response unit is set in the header, connection control information identifying it as the connection control cell is set in an empty area of the header, and connection information for controlling the specified connection is stored, to the switch;

the cell extracting means, accommodated in the second or first line response unit, for extracting the connection control cell which is transmitted by the first or second line response unit as opposed to the second or first line response unit and input form the switch, according to the connection control information; and means, accomodated in the first or second line response unit, for starting inflow of subscriber cells corresponding to the specified connection from the first line or the second line according to the connection information in the extracted connection control cell.

* * * * *